United States Patent
Mironica et al.

(10) Patent No.: US 12,175,641 B2
(45) Date of Patent: Dec. 24, 2024

(54) RESTORING DEGRADED DIGITAL IMAGES THROUGH A DEEP LEARNING FRAMEWORK

(71) Applicant: Adobe Inc., San Jose, CA (US)

(72) Inventors: Ionut Mironica, Bucharest (RO); Yijun Li, Seattle, WA (US)

(73) Assignee: Adobe Inc., San Jose, CA (US)

(*) Notice: Subject to any disclaimer, the term of this patent is extended or adjusted under 35 U.S.C. 154(b) by 861 days.

(21) Appl. No.: 17/338,949

(22) Filed: Jun. 4, 2021

(65) Prior Publication Data
US 2022/0392025 A1 Dec. 8, 2022

(51) Int. Cl.
*G06T 5/77* (2024.01)
*G06N 3/045* (2023.01)
(Continued)

(52) U.S. Cl.
CPC .............. *G06T 5/77* (2024.01); *G06N 3/045* (2023.01); *G06N 3/08* (2013.01); *G06T 3/18* (2024.01); *G06T 5/50* (2013.01); *G06T 5/70* (2024.01); *G06T 5/73* (2024.01); *G06T 7/11* (2017.01); *G06T 2207/20081* (2013.01);
(Continued)

(58) Field of Classification Search
CPC .... G06T 5/77; G06T 3/18; G06T 5/70; G06T 5/73; G06T 5/005; G06T 3/0093; G06T 5/002; G06T 5/003; G06T 5/50; G06T 7/11; G06T 2207/20081; G06T 2207/20084; G06T 2207/20092; G06T 2207/20221; G06T 2207/30201; G06N 3/045; G06N 3/0454; G06N 3/08
See application file for complete search history.

(56) References Cited

U.S. PATENT DOCUMENTS

2020/0364842 A1* 11/2020 Chaton ................... G06T 7/001
2020/0402289 A1* 12/2020 Risser ..................... G06T 7/40
(Continued)

OTHER PUBLICATIONS

Ruth Bergman, Ron Maurer, Hila Nachlieli, Gitit Ruckenstein, Patrick Chase, and Darryl Greig, "Comprehensive solutions for automatic removal of dust and scratches from images ", Journal of Electronic Imaging 17, 1 (2008), 013010.
(Continued)

*Primary Examiner* — Phuoc Tran
(74) *Attorney, Agent, or Firm* — Keller Preece PLLC

(57) ABSTRACT

The present disclosure relates to systems, methods, and non-transitory computer readable media for accurately, efficiently, and flexibly restoring degraded digital images utilizing a deep learning framework for repairing local defects, correcting global imperfections, and/or enhancing depicted faces. In particular, the disclosed systems can utilize a defect detection neural network to generate a segmentation map indicating locations of local defects within a digital image. In addition, the disclosed systems can utilize an inpainting algorithm to determine pixels for inpainting the local defects to reduce their appearance. In some embodiments, the disclosed systems utilize a global correction neural network to determine and repair global imperfections. Further, the disclosed systems can enhance one or more faces depicted within a digital image utilizing a face enhancement neural network as well.

20 Claims, 19 Drawing Sheets

(51) Int. Cl.
    G06N 3/08       (2023.01)
    G06T 3/18       (2024.01)
    G06T 5/50       (2006.01)
    G06T 5/70       (2024.01)
    G06T 5/73       (2024.01)
    G06T 7/11       (2017.01)
(52) U.S. Cl.
    CPC ............... G06T 2207/20084 (2013.01); G06T 2207/20092 (2013.01); G06T 2207/20221 (2013.01); G06T 2207/30201 (2013.01)

(56) References Cited

U.S. PATENT DOCUMENTS

| | | | | |
|---|---|---|---|---|
| 2022/0262108 | A1* | 8/2022 | Hida | G06N 3/047 |
| 2022/0398693 | A1* | 12/2022 | Sasagawa | G06T 5/00 |
| 2023/0125477 | A1* | 4/2023 | Gurumurthy | G06N 3/08 382/103 |
| 2024/0152756 | A1* | 5/2024 | Lakshmanan | G06N 3/08 |

OTHER PUBLICATIONS

Bernard Besserer and Cedric Thire. 2004. "Detection and tracking scheme for line scratch removal in an image sequence", European Conference on Computer Vision. Springer, 264-275.

I. Giakoumis, N. Nikolaidis, and I. Pitas, "Digital image processing techniques for the detection and removal of cracks in digitized paintings," IEEE Transactions on Image Processing, vol. 15, No. 1, pp. 178-188, 2005.

R.-C. Chang, Y.-L. Sie, S.-M. Chou, and T. K. Shih, "Photo defect detection for image inpainting," in Seventh IEEE International Sym- posium on Multimedia (ISM'05). IEEE, 2005, pp. 5.

F. Stanco, G. Ramponi, and A. De Polo, "Towards the automated restoration of old photographic prints: a survey," in the IEEE Region 8 EUROCON 2003. Computer as a Tool., vol. 2. IEEE, 2003, pp. 370-374.

V. Bruni and D. Vitulano, "A generalized model for scratch detection," IEEE transactions on image processing, vol. 13, No. 1, pp. 44-50, 2004.

Giorgio Trumpy and Rudolf Gschwind. 2015. "Optical detection of dust and scratches on photographic film", Journal on Computing and Cultural Heritage (JOCCH) 8, 2 (2015), 1-19.

David Strubel, Marc Blanchon, and Fofi David. 2019. Deep learning approach for artefacts correction on photographic films. In Fourteenth International Conference on Quality Control by Artificial Vision, vol. 11172. International Society for Optics and Photonics, 111720M.

K. Zhang, W. Zuo, S. Gu, and L. Zhang, "Learning deep cnn denoiser prior for image restoration," in Proceedings of the IEEE Conference on Computer Vision and Pattern Recognition, 2017, pp. 3929-3938.

M. He, D. Chen, J. Liao, P. V. Sander, and L. Yuan, "Deep exemplar-based colorization," ACM Transactions on Graphics (TOG), vol. 37, No. 4, pp. 1-16, 2018. [12] D. Chen, M. He, Q. Fan, J. Liao, L. Zhang, D. Hou, L. Yuan, and G. Hua, "Gated context aggregation network for image dehazing and deraining," WACV 2019, 2018.

K. Zhang, W. Zuo, Y. Chen, D. Meng, and L. Zhang, "Beyond a gaussian denoiser: Residual learning of deep cnn for image denoising," IEEE Transactions on Image Processing, vol. 26, No. 7, pp. 3142-3155, 2017.

C. Dong, C. C. Loy, K. He, and X. Tang, "Learning a deep convolutional network for image super- resolution," in European conference on computer vision. Springer, 2014, pp. 184-199.

W. Ren, S. Liu, H. Zhang, J. Pan, X. Cao, and M.-H. Yang, "Single image dehazing via multi-scale convolutional neural networks," in European conference on computer vision. Springer, 2016, pp. 154-169.

B. Zhang, M. He, J. Liao, P. V. Sander, L. Yuan, A. Bermak, and D. Chen, "Deep exemplar-based video colorization," in Proceedings of the IEEE Conference on Computer Vision and Pattern Recognition, 2019, pp. 8052-8061.

P. Isola, J.-Y. Zhu, T. Zhou, and A. A. Efros, "Image-toimage translation with conditional adversarial networks," in Computer Vision and Pattern Recognition (CVPR), 2017 IEEE Conference on, 2017.

Connelly Barnes, Eli Shechtman, Adam Finkelstein, and Dan B Goldman. "PatchMatch: A Randomized Correspondence Algorithm for Structural Image Editing" ACM Transactions on Graphics (Proc. SIGGRAPH) 28(3), 2009.

Eirikur Agustsson and Radu Timofte, NTIRE 2017 Challenge on Single Image Super-Resolution: Dataset and Study, The IEEE Conference on Computer Vision and Pattern Recognition (CVPR) Workshops, 2017.

Ziwei Liu, Ping Luo, Xiaogang Wang, Xiaoou Tang, "Deep Learning Face Attributes in the Wild", Proceedings of International Conference on Computer Vision (ICCV), 2015.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg and Li Fei-Fei, ImageNet Large Scale Visual Recognition Challenge. IJCV, 2015.

Bookstein et al. Principal Warps: Thin-Plate Splines and the Decomposition of Deformations; IEEE Transactions on Pattern Analysis and Machine Intelligence. vol. II. No. 6. Jun. 1989.

OpenCV; Open Source Computer Vision; Seamless Cloning; https://docs.opencv.org/master/df/da0/group_photo_clone.html; Date downloaded Jun. 7, 2021.

Karras et al. Analyzing and Improving the Image Quality of StyleGAN. In CVPR 2019.

* cited by examiner

| Algorithm | mIoU |
|---|---|
| Prior Image Editing System | 0.61 |
| DeepLab v3 | 0.63 |
| Unet | 0.55 |
| Segnet | 0.42 |
| Image Restoration System | 0.73 |

Fig. 6

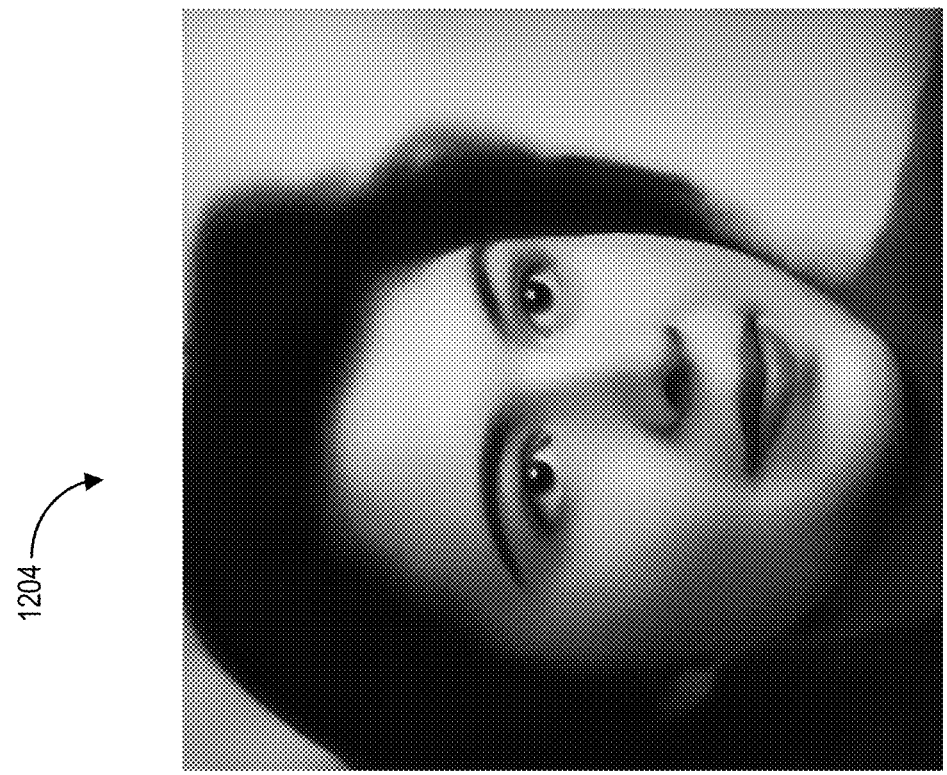
Fig. 12

1400

```
┌─────────────────────────────────────────────────────────────┐
│  Generating A Segmentation Mask Indicating Local Defects 1402│
└─────────────────────────────────────────────────────────────┘
                              │
                              ▼
┌─────────────────────────────────────────────────────────────┐
│       Determining Pixels To Fill The Local Defects 1404     │
└─────────────────────────────────────────────────────────────┘
                              │
                              ▼
┌─────────────────────────────────────────────────────────────┐
│ Generating A Modified Digital Image By Inpainting The Local Defects 1406 │
└─────────────────────────────────────────────────────────────┘
```

*Fig. 14*

RESTORING DEGRADED DIGITAL IMAGES THROUGH A DEEP LEARNING FRAMEWORK

BACKGROUND

Many historical images are distorted by the limitations of early cameras and the degradation of photo print papers and film photos, in addition to deterioration due to environmental conditions over time. Researchers and engineers have attempted to resolve these issues in recent years using software and hardware platforms for digital image editing to reconstruct missing or flawed regions of digital images. Indeed, some conventional digital image editing systems utilize retouching techniques to fill missing or damaged pixels for removing particular scratches or blemishes one at a time. Despite these advancements, conventional digital image editing systems continue to experience a number of impediments or disadvantages, particularly with regard to accuracy, efficiency, and flexibility.

SUMMARY

One or more embodiments described herein provide benefits and solve one or more of the foregoing or other problems in the art with systems, methods, and non-transitory computer readable media that accurately, efficiently, and flexibly restore degraded digital images utilizing a deep learning framework. In particular, in one or more embodiments, the disclosed systems restore degraded digital images that depict local defects (e.g., dust, scratches, tears, folds, and creases) and global imperfections (e.g., image blur, image noise, faded colors, grainy image, and sepia effects) utilizing a multistep process that involves a defect detection neural network and a global correction neural network. For example, the disclosed systems utilize a defect detection neural network to generate a segmentation map indicating locations of local defects within a digital image. In some cases, the disclosed systems further utilize an inpainting model to determine pixels from the digital image to use for filling the local defects to reduce their appearance. In certain implementations, the disclosed systems also (or alternatively) utilize a global correction neural network to determine and repair global imperfections. In some embodiments, the disclosed systems perform additional steps to enhance one or more faces depicted within a digital image utilizing a face enhancement neural network as well. By utilizing the deep learning approach to restored degraded digital images, the disclosed systems exhibit improved accuracy, efficiency, and flexibility over conventional digital image editing systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 6 illustrates an example table of performance improvements of the image restoration system compared to conventional systems in accordance with one or more embodiments;

FIG. 12 illustrates an example comparison of a degraded digital image and a modified, restored digital image generated by the image restoration system in accordance with one or more embodiments;

FIGS. 14-16 illustrate example flowcharts of series of acts for generating a modified digital image by repairing local defects, correcting global imperfections, and/or enhancing depicted faces in accordance with one or more embodiments.

DETAILED DESCRIPTION

Figure 1:
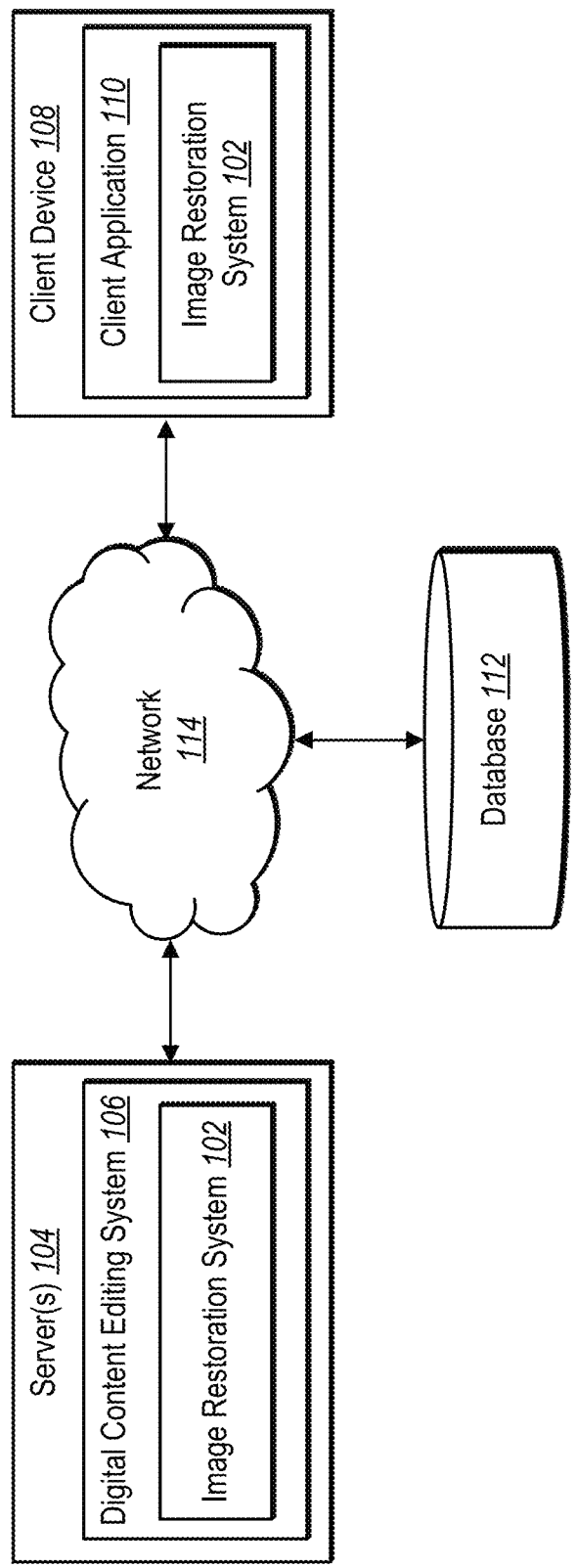
FIG. 1 illustrates an example system environment in which an image restoration system operates in accordance with one or more embodiments.

One or more embodiments described herein include an image restoration system that accurately, efficiently, and flexibly restores digital images by removing local defects and/or global imperfections utilizing a deep learning framework. In particular, in one or more embodiments, the image restoration system restores a digital image that depicts degradation or other damage to an old photograph. For example, the image restoration system performs one or more steps to restore a degraded digital image, such as i) detecting and repairing local defects within the digital image, ii) correcting global imperfections within the digital image, and/or iii) enhancing one or more faces depicted within the digital image. In certain implementations, the image restoration system also generates customized, synthetic sets of sample digital images for learning parameters of one or more neural network architectures involved in the image restoration process, such as a defect detection neural network, a global correction neural network, and/or a face enhancement neural network. As described in further detail below, the image restoration system outperforms conventional digital image editing system in accuracy, efficiency, and flexibility utilizing the deep learning framework described herein.

As just mentioned, in some embodiments, the image restoration system detects and repairs local defects within a digital image. In particular, the image restoration system utilizes a defect detection neural network to analyze the digital image and determine locations of one or more local defects. For example, the image restoration system generates a segmentation mask from the digital image that indicates locations of local defects such as missing, blank, flawed, or damaged pixels that are the result of scratches, dust, folds, creases, or tears (e.g., in an original photograph).

In some embodiments, the image restoration system further repairs the local defects utilizing an inpainting model. For example, the image restoration system utilizes an inpainting model to determine pixels within the digital image to use for filling or replacing the missing, blank, flawed, or damaged pixels of the local defects. In some cases, the image restoration system thus generates a modified digital image by inpainting the local defects with determined pixels from the digital image that reduce the appearance of the local defects, thereby improving the look and quality of the digital image by removing (or at least reducing) the appearance of scratches, dust, tears, or creases.

To accurately identify or determine local defects within the digital image for repair, in some embodiments, the image restoration system learns parameters for the defect detection neural network. For example, the image restoration system learns or tunes parameters of the defect detection neural network to learn to accurately identify or determine locations of local defects based on specifically tailored training data. In some cases, the image restoration system generates the training data in the form of a set of sample defect digital images from which the image restoration system learns parameters for the defect detection neural network.

For instance, the image restoration system generates a set of sample defect digital images by artificially adding defects to digital images and applying a synthetic aging algorithm to age or "oldify" the digital images. In some cases, the image restoration system further utilizes the sample defect digital images to learn or tune the parameters of the defect detection neural network and/or the global correction neural network. For example, the image restoration system repeats (for a number of iterations or epochs) the learning process of utilizing the defect detection neural network to generate a segmentation mask for a sample defect digital image, determining a loss indicating a measure of accuracy associated with the generated segmentation mask (e.g., as compared to a ground truth segmentation mask), and modifying parameters of the defect detection neural network to reduce the measure of loss. Over multiple iterations or epochs, the image restoration system thus learns parameters for the defect detection neural network that produce accurate segmentation masks.

In addition to learning parameters for, and repairing, local defects, in some embodiments the image restoration system further utilizes a global correction technique to improve global imperfections within digital images. For example, the image restoration system utilizes a global correction neural network to determine, identify, or detect global imperfections within a digital image (e.g., a digital image with or without repaired local defects). In some implementations, the image restoration system detects the global imperfections in the form of image blur, image noise, faded color, and/or faded saturation.

For instance, the image restoration system utilizes a global correction neural network to identify and correct global imperfections by reducing image blur, reducing image noise, improving image color, and/or improving color saturation in global sense (e.g., for the entire digital image). In some cases, the image restoration system further learns parameters for the global correction neural network through a training or tuning process involving customized training data. Additional detail regarding training and applying the global correction neural network is provided below with reference to the figures.

In one or more embodiments, the image restoration system additionally or alternatively enhances faces depicted within digital images (e.g., on top of, or alternatively to, repairing local defects and/or correcting global imperfections). For example, the image restoration system utilizes a face enhancement neural network to identify or isolate pixels of a digital image that depict a face and to improve or clarify the depiction of the face. In some cases, the image restoration system maps a digital image into a latent space associated with the face enhancement neural network.

In these or other cases, the image restoration system further compares the latent representation of the digital image with latent codes already in the latent space to identify a corresponding (e.g., nearest or closest) latent code within the latent space. Upon identifying the corresponding latent code, the image restoration system inputs the latent code into a face enhancement neural network to generate a modified digital image (e.g., an enhanced, clean version of the initial digital image) from the latent code. In certain embodiments, the image restoration system learns parameters for the face enhancement neural network utilizing a training or tuning process to teach the face enhancement neural network to generate clean digital images from latent codes (e.g., latent codes of noise data).

As suggested above, conventional digital image editing systems exhibit a number of drawbacks, particularly in accuracy, efficiency, and flexibility. To illustrate, many conventional systems inaccurately restore digital images. For example, the conventional restoration approaches of many prior digital image editing systems are destructive of digital images, removing sharpness, making digital images softer (and sometimes ruining the images beyond usability) in attempting to remove local defects and/or global imperfections.

In addition, many conventional digital image editing systems are also inefficient. In particular, to remove or repair local defects from digital images, some conventional systems require excessive numbers of edits to individually select and repair scratches, dust marks, and other local defects. These approaches are often prohibitively slow, requiring far too many edits and far too much time to be used in largescale applications to restore large numbers of digital images. Not only are some conventional systems slow, but they often require unnecessary amounts of computing resources such as processing power and memory to process each and every edit/input required to identify and repair local defects using such techniques.

As another example of their inefficiency, many conventional digital image editing systems require multiple applications or interfaces to restore different aspects of a single digital image. For example, some conventional systems require a first application to repair local defects such as dust and scratches and an entirely separate application to correct global imperfections such as blur and noise. Thus, these conventional systems not only require navigation between separate interfaces and applications to perform various functions in image restoration, but they also require the computing resources to store and apply the various applications required, while also processing the data to move digital images between applications as well.

Relating to their inefficiency, conventional digital image editing systems are often inflexible. For instance, as discussed above, conventional systems are rigidly tailored to address individual aspects of image restoration. Indeed, some conventional systems correct local defects such as dust and scratches, while other conventional systems correct global imperfections such as blur and noise. Unfortunately, these conventional systems are often siloed to the point where they are unable to adapt to a more end-to-end solution for digital image restoration. For example, conventional systems for denoising or deblurring are specialized for unstructured imperfections and cannot account for local defects that are more structural in nature.

As suggested above, embodiments of the image restoration system can provide several advantages over conventional digital image editing systems. For example, embodiments of the image restoration system can provide improved accuracy over conventional systems. While many conventional systems inaccurately restore digital images through processes that require removing image sharpness and other destructive side effects to remove defects, the image restoration system restores digital image without such destructive side effects. Indeed, embodiments of the image restoration system utilize a defect detection neural network and a global correction neural network to accurately repair local defects and/or global imperfections while preserving other pixels of a digital image. By utilizing the networks and methods described, the image restoration system is able to correct images even with high distortions (e.g., to faces or other portions) and can correct even severely degraded digital images.

The image restoration system can also improve computational efficiency over many conventional digital image editing systems. As opposed to conventional systems that require excessive numbers of user interactions to granularly select and repair flawed or damaged pixels in digital images, the image restoration system utilizes a defect detection neural network and/or a global correction neural network to automatically (e.g., without user input for individual selection and correction) detect and repair local defects and global imperfections. Thus, compared to some prior systems, the image restoration system greatly reduces the number of user interactions required for image restoration. As a result of requiring fewer user interactions, the image restoration system therefore also requires fewer computing resources to process the user interactions required for restoring digital images.

Moreover, embodiments of the image restoration system further improve flexibility over conventional digital image editing systems. Indeed, compared to conventional systems that rigidly require multiple interfaces and/or applications to separately correct different types of defects within a single digital image, the image restoration system flexibly adapts to detect and repair defects of various types throughout an image within a single application and/or a single interface. By utilizing an end-to-end approach for restoring digital images through repairing different types of defects and/or imperfections, embodiments of the image restoration system are not only more flexible than conventional systems but also require fewer computing resources. Indeed, due to the improved flexibility, the image restoration system need not process data to transmit digital images between systems or applications for repairing different types of defects, but can instead perform an end-to-end restoration in a single application and/or interface.

Additional detail regarding the image restoration system will now be provided with reference to the figures. For example, FIG. 1 illustrates a schematic diagram of an example system environment for implementing an image restoration system 102 in accordance with one or more embodiments. An overview of the image restoration system 102 is described in relation to FIG. 1. Thereafter, a more detailed description of the components and processes of the image restoration system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 17.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 17. Although FIG. 1 illustrates a single instance of the client device 108, in some embodiments, the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, edit, modify, or generate digital content, such as a digital image. Thus, the image restoration system 102 on the server(s) 104 receives information or instructions to restore a degraded digital image based on user interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including an image editing interface for restoring or repairing damaged or degraded digital images. For example, a user interacts with the client application 110 to provide user input to generate a modified digital image by detecting and repairing local defects and/or global imperfections within the digital image.

As illustrated in FIG. 1, the environment includes the server(s) 104. The server(s) 104 generates, tracks, stores, processes, receives, and transmits electronic data, such as digital image modifications and indications of user interactions. For example, the server(s) 104 receives data from the client device 108 in the form of an indication of a user interaction to select (and/or adjust a measure of) a local defect reduction element, a global imperfection reduction element, and/or a face enhancement element displayed within a user interface. In addition, the server(s) 104 transmits data to the client device 108 to cause the client device 108 to display or present a modified digital image with reduced local defects, reduced global imperfections, and/or enhanced faces. For example, the server(s) 104 generate a modified digital image by utilizing a defect detection neural network, a global correction neural network, and/or a face enhancement neural network. Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server.

As further shown in FIG. 1, the server(s) 104 also includes the image restoration system 102 as part of a digital content editing system 106. For example, in one or more implementations, the digital content editing system 106 can store, generate, modify, edit, enhance, provide, and/or share digital content, such as digital images or digital videos. For example, the digital content editing system 106 can crop, enhance, repair, restore, or otherwise modify digital images based on user input. In some implementations, the digital content editing system 106 supports the training and application of various neural network architectures at the server(s) 104 or the client device 108. Indeed, in one or more implementations, the server(s) 104 includes all, or a portion of, the image restoration system 102. In some cases, the image restoration system 102 generates and provides a modified digital image to the client device 108 (e.g., as part of an image editing application). In these or other cases, the client device 108 includes all or part of the image restoration system 102 to, for example, generate, obtain (e.g., download), and/or implement one or more digital image restoration methods from the server(s) 104.

Indeed, in some implementations, as illustrated in FIG. 1, the image restoration system 102 is located in whole or in part of the client device 108. For example, the image restoration system 102 includes a web hosting application that allows the client device 108 to interact with the server(s) 104. To illustrate, in one or more implementations, the client device 108 accesses a web page supported and/or hosted by the server(s) 104. For example, the client device 108 provides a digital image to the server(s) 104 along with a request to generate a modified digital image using a particular deep learning architecture, and, in response, the image restoration system 102 on the server(s) 104 generates a modified, restored digital image. The server(s) 104 then provides the modified, clean digital image to the client device 108 for display.

The digital content editing system 106 communicates with the client device 108 to perform various functions associated with the image restoration system 102, such as storing and managing a repository of digital images, generating restored digital images, and providing restored digital images for display. Indeed, as further shown in FIG. 1, the environment includes the database 112. For example, the image restoration system 102 communicates with the database 112 to access a repository of digital images and/or access or store a defect detection neural network, a global correction neural network, and/or a face enhancement neural network.

Although FIG. 1 illustrates a particular arrangement of the environment, in some embodiments, the environment has a different arrangement of components and/or may have a different number or set of components altogether. For instance, as mentioned, the image restoration system 102 is implemented by (e.g., located entirely or in part on) the client device 108. For example, in one or more implementations, the client device 108 obtains (e.g., downloads) the image restoration system 102 from the server(s) 104. Once downloaded, the image restoration system 102 on the client device 108 restores images independent from the server(s) 104. Indeed, in one or more implementations, the server(s) 104 may learn parameters for the image restoration system 102. Once learned, the server(s) 104 can provide the client device 108 access to the image restoration system 102 (either by sending the image restoration system 102 to the client device 108 or remotely providing one or more functions/features of the image restoration system 102 to the client device 108).

In addition, in one or more embodiments, the client device 108 communicates directly with the image restoration system 102, bypassing the network 114. Further, in some embodiments, the database 112 is located external to the server(s) 104 (e.g., in communication via the network 114) or located on the server(s) 104 and/or on the client device 108. In some cases, the image restoration system 102 includes a defect detection neural network, a global correction neural network, and/or a face enhancement neural network (e.g., within the server(s) 104, the database 112, or the client device 108).

Figure 2:
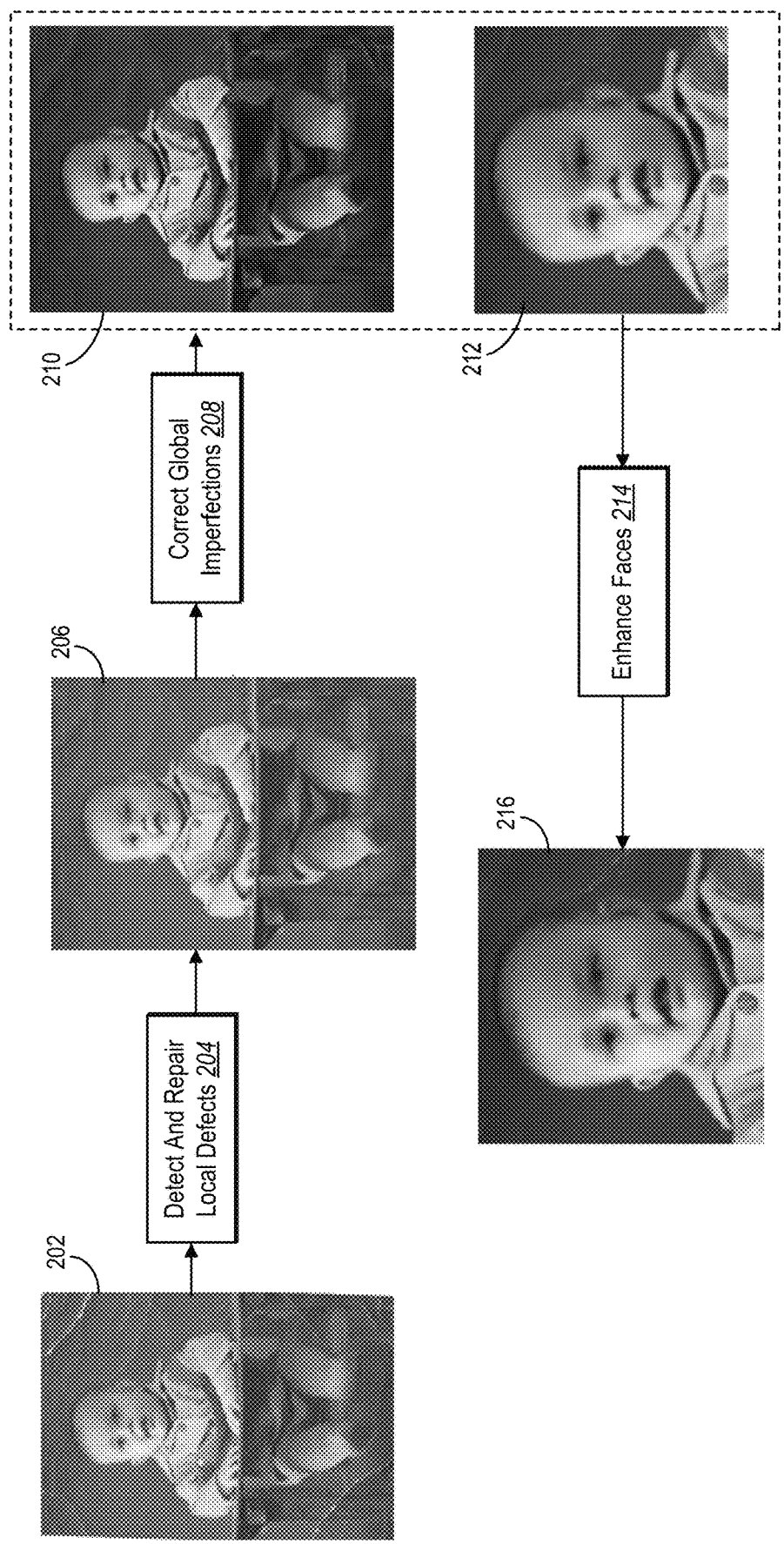
FIG. 2 illustrates an overview of generating a modified, restored digital image by repairing local defects, correcting global imperfections, and enhancing depicted faces in accordance with one or more embodiments.

As mentioned, in one or more embodiments, the image restoration system 102 generates a modified digital image by restoring or repairing certain flaws or defects depicted within the digital image. In particular, the image restoration system 102 utilizes a deep learning architecture to repair and correct local defects, global imperfections, and/or depicted faces. FIG. 2 illustrates an example process for restoring digital images in accordance with one or more embodiments. The description of FIG. 2 provides an overview of generating a modified digital image in accordance with this disclosure. Additional detail regarding the various specific acts is provided thereafter with reference to subsequent figures.

As illustrated in FIG. 2, the image restoration system 102 receives an initial digital image 202 depicting a baby sitting in a highchair. As shown, the initial digital image 202 depicts various scratches, creases, folds, and/or tears. Indeed, in some cases, the initial digital image 202 is a scan (or some other digitized version) of an old, historic photograph that has been folded, faded, torn, or otherwise degraded. Thus, the initial digital image 202 depicts local defects as well as global imperfections. For example, a local defect includes a visual defect in a digital image that is localized or specific to a particular location or portion of a digital image. In some cases, a local defect is structural in nature in that it can be defined or specifically identified by a particular number of pixels that depict the local defect. Example local defects include dust, scratches, tears, folds, and creases. Conversely, a global imperfection includes a visual imperfection that is not localized but is rather visible in all or a majority of a digital image, either uniformly or non-uniformly. In some cases, a global imperfection is nonstructural in nature in that it cannot be defined or identified by a particular localized group of pixels but rather affects or spreads across various portions of a digital image. Example global imperfections include image blur, image noise, faded colors, grainy image, faded saturation, and sepia effects.

In any event, the image restoration system 102 performs an act 204 to detect and repair local defects. In particular, the image restoration system 102 utilizes a defect detection neural network to analyze the initial digital image 202 to detect local defects. For example, a defect detection neural network includes a neural network that determines, identifies, or detects local defects within a digital image. In some cases, a defect detection neural network includes a neural network that determines and labels or otherwise distinguishes pixels depicting a local defect apart from other pixels of a digital image.

Along these lines, a neural network includes a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

As mentioned, the image restoration system 102 utilizes the defect detection neural network to generate a segmentation mask that indicates locations of local defects within the initial digital image 202. For instance, the image restoration system 102 analyzes the initial digital image 202 to generate a segmentation mask that depicts or portrays locations and pixels that are missing, flawed, or otherwise degraded. In some cases, a segmentation mask includes a representation or a depiction of pixel classifications or labels for pixels of a digital image. For example, a segmentation mask includes a visual representation to distinguish pixels of one type (e.g., local defect pixels) from pixels of another type (e.g., non-local-defect pixels). In some embodiments, a segmentation mask is binary to distinguish between two types of pixels, while in other embodiments a segmentation mask distinguishes between more than two types of pixels (e.g., to distinguish between different types of local defects).

In addition, the image restoration system 102 repairs the local defects indicated by the segmentation mask. For example, the image restoration system 102 utilizes an inpainting model to analyze the initial digital image 202 and determine pixels that are appropriate for filling or inpainting the local defects. In some cases, an inpainting model includes a computer model that is executable to analyze a digital image based on a set of rules and/or probabilities to identify replacement pixels (e.g., pixels that will appear to seamlessly blend together with surrounding pixels) to fill or inpaint missing, flawed, or otherwise undesirable pixels of a digital image. Indeed, an inpainting model can include instructions to identify replacement pixels along with instructions to utilizes the replacement pixels to fill degraded pixels of a local defect.

Specifically, the image restoration system 102 identifies pixels that, when used to replace the pixels depicting the local defects, reduce or eliminate the appearance of the local defects. The image restoration system 102 thus replaces the degraded or flawed pixels of the local defects with replacement pixels from the digital image to generate an intermediate modified digital image 206. As shown, the intermediate modified digital image 206 depicts reduced local defects, having had the pixels inpainted with replacement pixels to match those in the surrounding areas for a seamless appearance.

As further illustrated in FIG. 2, the image restoration system 102 performs an act 208 to correct global imperfections. In particular, the image restoration system 102 utilizes a global correction neural network to determine or identify global imperfections within the intermediate modified digital image 206. For example, the image restoration system 102 utilizes a global correction neural network to extract a feature vector from the intermediate modified digital image. In some cases, a feature vector includes a vector of observable and/or unobservable (e.g., deep, hidden, and/or latent) features representing a digital image (e.g., where individual pixels and/or channels of a neural network can correspond to separate extracted features).

In addition, the image restoration system 102 utilizes the global correction neural network to correct any identified global imperfections. Indeed, in one or more embodiments, a global correction neural network includes a neural network that determines, detects, or identifies global imperfections and generates modified digital images by reducing the appearance of the global imperfections. For example, a global correction neural network includes a neural network that extracts a feature vector from a digital image and that modifies the feature vector to reduce the appearance of one or more global imperfections (e.g., by reducing or removing image blur and/or by improving image color). By utilizing the global correction neural network, the image restoration system 102 generates an additional modified digital image 210. As shown, the additional modified digital image 210 depicts improved colors (or shading) and reduced blur compared to the intermediate modified digital image 206.

As further illustrated in FIG. 2, the image restoration system 102 performs an act 214 to enhance faces. To elaborate, the image restoration system 102 identifies or detects faces depicted within a digital image. In addition, the image restoration system 102 enhances the pixels depicting the face, along with pixels in a particular area around the face, while ignoring or avoiding other pixels of the digital image. As shown, the image restoration system 102 modifies the face depicted within the additional modified digital image 210 by identifying the pixels in the digital image portion 212 to enhance from the additional modified digital image 210. In some cases, the image restoration system 102 determines and selects a portion of a digital image surrounding a depicted face in a square shape or some other shape (e.g., a regular or irregular polygon).

In addition, the image restoration system 102 enhances the face by utilizing a face enhancement neural network. To elaborate, the image restoration system 102 utilizes a face enhancement neural network to sharpen, clarify, or otherwise enhance a depicted face that is blurry, faded, or otherwise degraded. In some cases, a face enhancement neural network includes a neural network that identifies or detects one or more depicted faces and that generates a modified digital image from a latent code corresponding to the one or more depicted faces.

Indeed, in some embodiments, the image restoration system 102 maps the additional modified digital image 210 (or the identified digital image portion 212) to a latent space utilizing the face enhancement neural network. In addition, the image restoration system 102 determines, from the latent space, a latent code that corresponds to (e.g., is nearest or closest to) the mapping of the additional modified digital image 210 (or the digital image portion 212). In some cases, the image restoration system 102 further inputs the latent code into the face enhancement neural network to generate an enhanced face image 216. In certain embodiments, a latent code refers to a latent (e.g., unobservable) feature representation of a digital image (or a portion of a digital image) within a latent space. Relatedly, a latent space includes a space generated by one or more layers of a neural network where digital images are represented by latent codes that can be compared and analyzed within the latent space.

As shown, the enhanced face image 216 depicts sharpened features of the baby's face and shirt collar, where the eyes, ears, mouth, nose, and shirt features are less blurry than those depicted in the digital image portion 212. In some embodiments, the image restoration system 102 further combines the enhanced face image 216 with the additional modified digital image 210 to generate a final modified digital image (e.g., where the pixels of the enhanced face image 216 replace pixels of the additional modified digital image 210).

While FIG. 2 illustrates a particular sequence of the acts involved in restoring a digital image, the acts can be performed in additional or alternative sequences as well. For example, in some cases, the image restoration system 102 performs the act 204 without performing either of the acts 208 or 214. In other cases, the image restoration system 102 performs the act 208 without first performing the act 204. In still other cases, the image restoration system 102 performs the act 214 without performing the act 208 and/or the act 204. Indeed, the image restoration system 102 can perform the acts illustrated in FIG. 2 in any order, omitting and including the acts in different combinations for particular circumstances.

Figure 3:
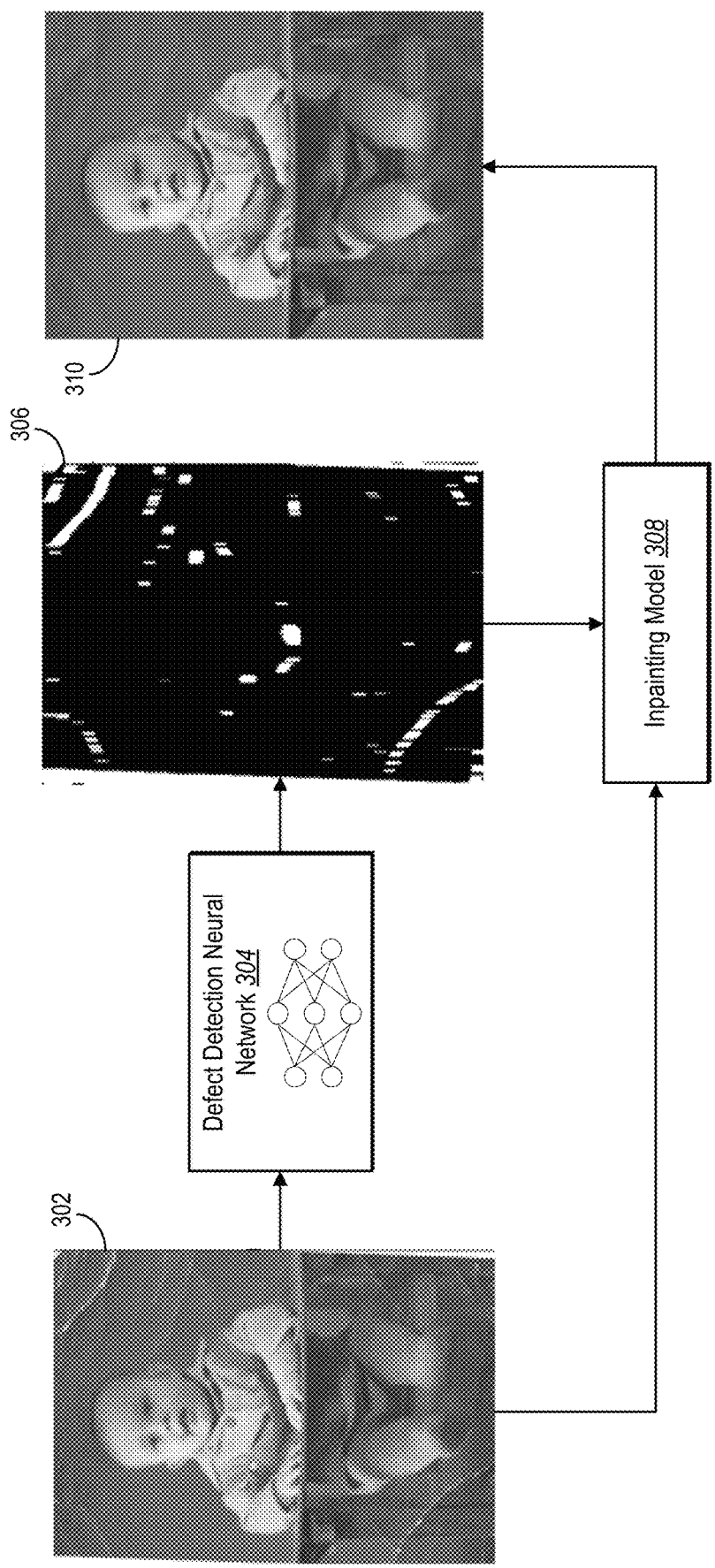
FIG. 3 illustrates an example process of generating a modified digital image by utilizing a defect detection neural network and an inpainting model to detect and repair local defects in accordance with one or more embodiments.

As mentioned, in certain described embodiments, the image restoration system 102 detects and repairs local defects depicted within a digital image. In particular, the image restoration system 102 detects local defects utilizing a defect detection neural network and repairs the local defects utilizing an inpainting model. FIG. 3 illustrates an example process of detecting and repairing local defects in accordance with one or more embodiments.

As illustrated in FIG. 3, the image restoration system 102 inputs a digital image 302 into a defect detection neural network 304. In response, the defect detection neural network 304 analyzes the digital image 302 to identify or determine locations of local defects. For example, the defect detection neural network 304 processes pixels of the digital image 302 to extract features and generate a prediction from the extracted features. More specifically, the defect detection neural network 304 generates a prediction in the form of a segmentation mask 306.

Indeed, the image restoration system 102 generates the segmentation mask 306 utilizing the defect detection neural network 304. As shown, the segmentation mask 306 is a binary mask that indicates locations (e.g., pixel coordinates) of local defects within the digital image 302. Particularly, the segmentation mask 306 has dimensions corresponding to (e.g., the same as) dimensions of the digital image 302 and distinguishes between pixels depicting local defects (e.g., with white pixels in the segmentation mask 306) and pixels not depicting local defects (e.g., with black pixels in the segmentation mask 306).

As further illustrated in FIG. 3, the image restoration system 102 utilizes an inpainting model 308 to inpaint or fill pixels of the local defects. In particular, the image restoration system 102 inpaints the pixels of the local defects indicated by segmentation mask 306 utilizing the inpainting model 308. For example, the image restoration system 102 utilizes the inpainting model to process pixels of the digital image 302 to identify replacement pixels for filling or replacing the pixels of the local defects. In some cases, the image restoration system 102 determines pixels based on a multi-stage probabilistic search of the digital image 302 to identify pixels from the digital image 302 (e.g., in areas surrounding local defects or elsewhere) that match or blend with the surrounding pixels to reduce the appearance of the local defects while preserving texture. For instance, the image restoration system 102 utilizes the PatchMatch inpainting model described by Connelly Barnes, Eli Shechtman, Adam Finkelstein, and Dan B. Goldman in *PatchMatch: A Randomized Correspondence Algorithm for Structural Image Editing*, ACM Transactions on Graphics 28.3 (2009), which is incorporated by reference herein in its entirety. In still further implementations, the image restoration system 102 utilizes an inpainting approach as described by C. Yang et al., *High-resolution Image Inpainting Using Multiscale Neural Patch Synthesis*, In Proceedings of the IEEE Conference on Computer Vision and Pattern Recognition, pages 6721-6729, (2017), the content of which is hereby incorporated by reference in its entirety. Additionally, in another implementation, the image restoration system 102 utilizes of an inpainting approach as described by J. Yu et al., *Generative Image Inpainting with Contextual Attention*, In Proceedings of the IEEE Conference on Computer Vision and Pattern Recognition, pages 5505-5514, (2018), the content of which is hereby incorporated by reference in its entirety. Furthermore, in another implementation, the image restoration system 102 utilizes an inpainting approach as described by Y. Zeng et al., *High-resolution Image Inpainting With Iterative Confidence Feedback and Guided Upsampling*, arrXiv: 2005.11742, (2020), the content of which is hereby incorporated by reference in its entirety.

As shown in FIG. 3, the image restoration system 102 generates the modified digital image 310 by inpainting the local defects of the digital image 302. Indeed, the modified digital image 310 depicts a significant decrease in local defects, with the scratches and folds almost entirely gone in some places. Even for those local defects that have not disappeared entirely, the modified digital image 310 nevertheless shows a visible reduction in their number and severity. Indeed, the use of the defect detection neural network to generate a segmentation mask 306 results in a significant increase in accuracy as the defect detection neural network is able to detect multiple types and sizes of local defects. Furthermore, the use of the defect detection neural network to generate a segmentation mask 306 increase efficiency as the single neural network is able to detect multiple types and sizes of local defects. In contrast to some conventional system, the image restoration system 102 is faster and uses less computing resources because the defect detection neural network is able to do the work of multiple different models (e.g., a dust detection model, a scratch detection model, a fold detection model).

Figure 4:
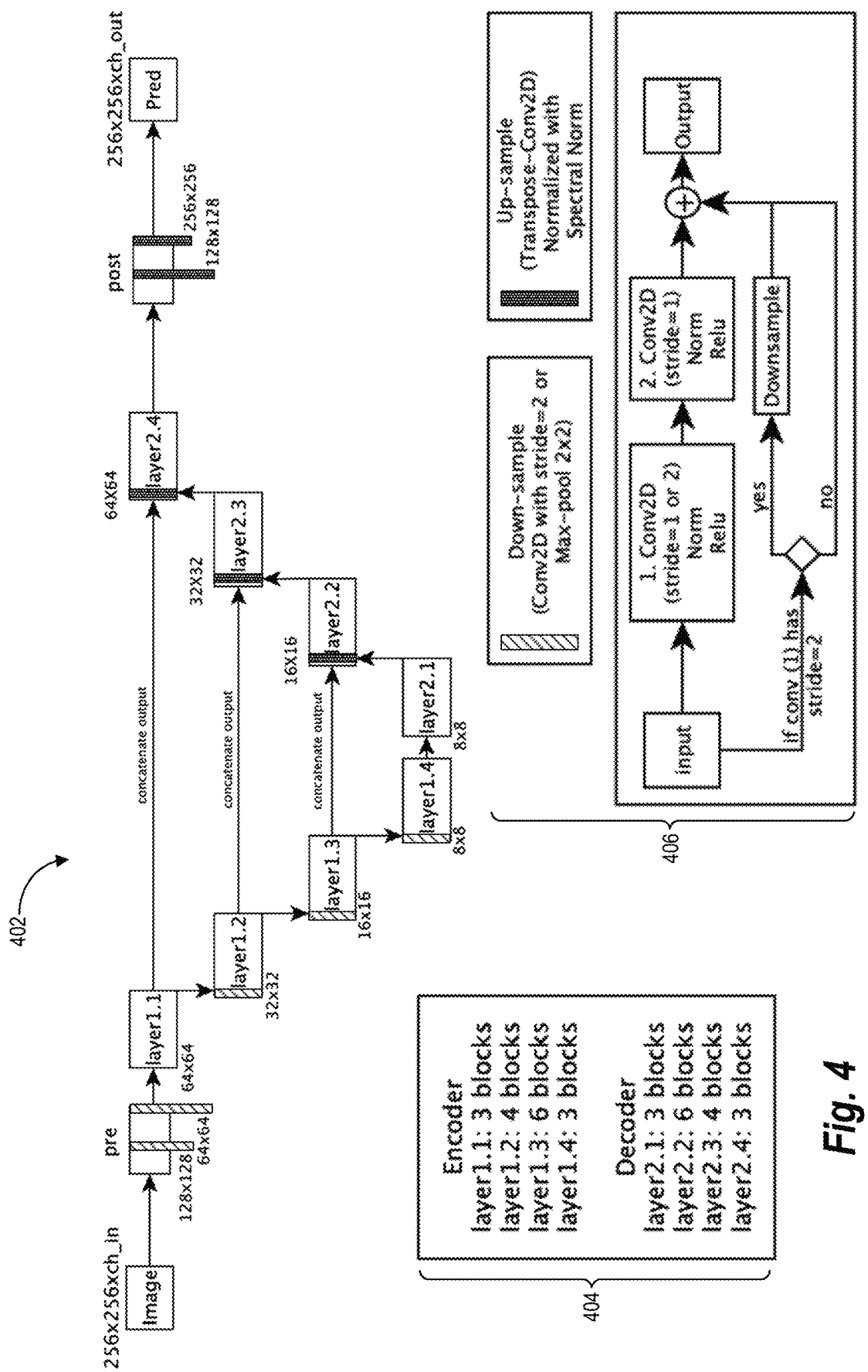
FIG. 4 illustrates an example network architecture for a defect detection neural network in accordance with one or more embodiments.

As mentioned, in certain described embodiments, the image restoration system 102 utilizes a defect detection neural network to detect local defects within a digital image. In particular, the image restoration system 102 utilizes a defect detection neural network to determine locations of local defects within a digital image, as indicated by a segmentation mask. FIG. 4 illustrates an example architecture of a defect detection neural network 402 (e.g., the defect detection neural network 304) in accordance with one or more embodiments.

As illustrated in FIG. 4, the defect detection neural network 402 includes an encoder neural network and a decoder neural network. In particular, the table 404 indicates the layers of the defect detection neural network 402 that are part of the encoder neural network and the layers that are part of the decoder neural network. As shown, the decoder neural network includes a mirrored version of the encoder neural network, where the layers that make up the decoder mirror those that make up the encoder. Indeed, the encoder is structured in the order: 3 blocks, 4 blocks, 6 blocks, and 3 blocks in its respective layers. Conversely, the decoder is structured: 3 blocks, 6 blocks, 4 blocks, and 3 blocks—a mirrored version of the encoder.

As illustrated, the image restoration system 102 inputs a digital image ("Image") into the defect detection neural network 402, whereupon the encoder neural network (e.g., layer 1.1 through layer 1.4) encodes the digital image into features using its respective layers. For instance, the layers of the encoder downsample and convolve the input as indicated by the sample block in the key 406 (e.g., beginning with "input" and ending with "output"). As shown, the encoder and the decoder have four types of residual blocks: 64×64 (3 blocks), 32×32 (4 blocks), 16×16 (6 blocks), and 8×8 (3 blocks).

In addition, the image restoration system 102 passes the encoded features to the decoder (e.g., layer 2.1 through layer 2.4), whereupon the decoder decodes the features to generate a predicted output ("Pred") in the form of a segmentation mask. As shown in the key 406, the decoder layers upsample the features to generate a segmentation mask in the resolution of the initial input image. As shown, the defect detection neural network 402 also concatenates outputs at various layers to pass from the encoder to the decoder as part of generating the segmentation mask. In one or more embodiments, the image restoration system 102 utilizes a defect detection neural network 402 modeled after the Unet-Resnet network with spectral normalization.

Figure 5A:
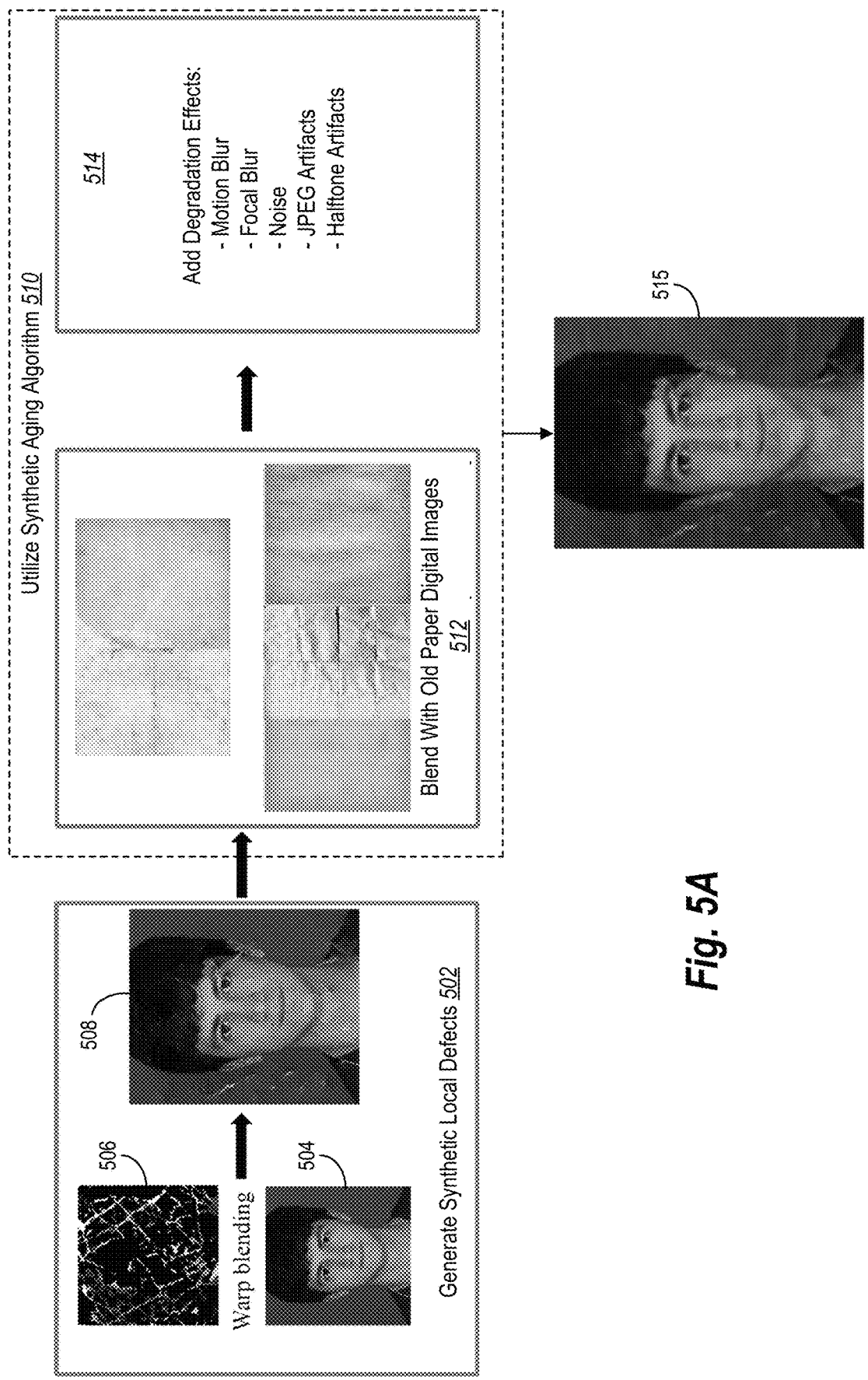
FIGS. 5A-5C illustrate an example process of generating a dataset of sample defect digital image for training a defect detection neural network in accordance with one or more embodiments.
Figure 5B:
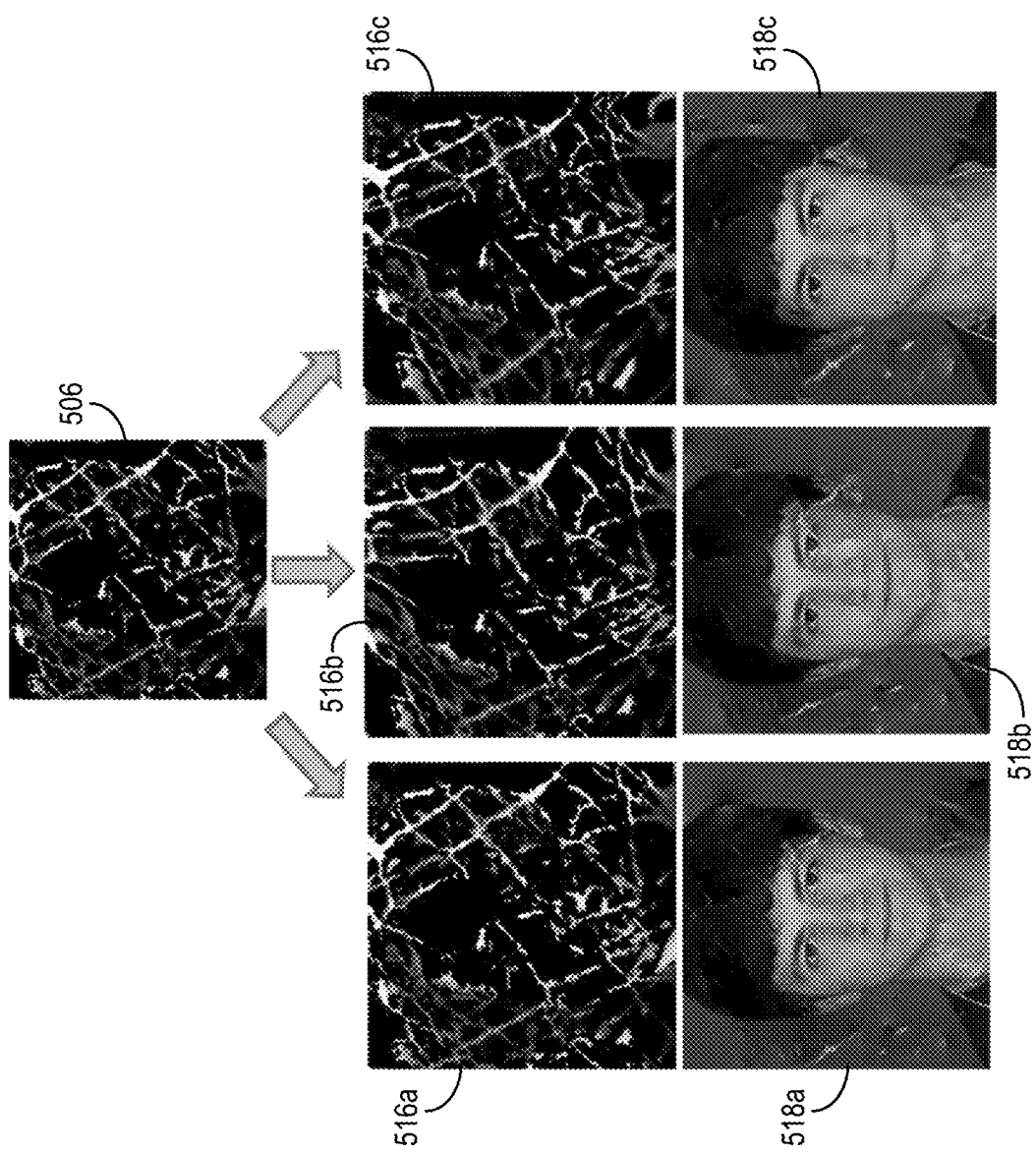
Figure 5C:
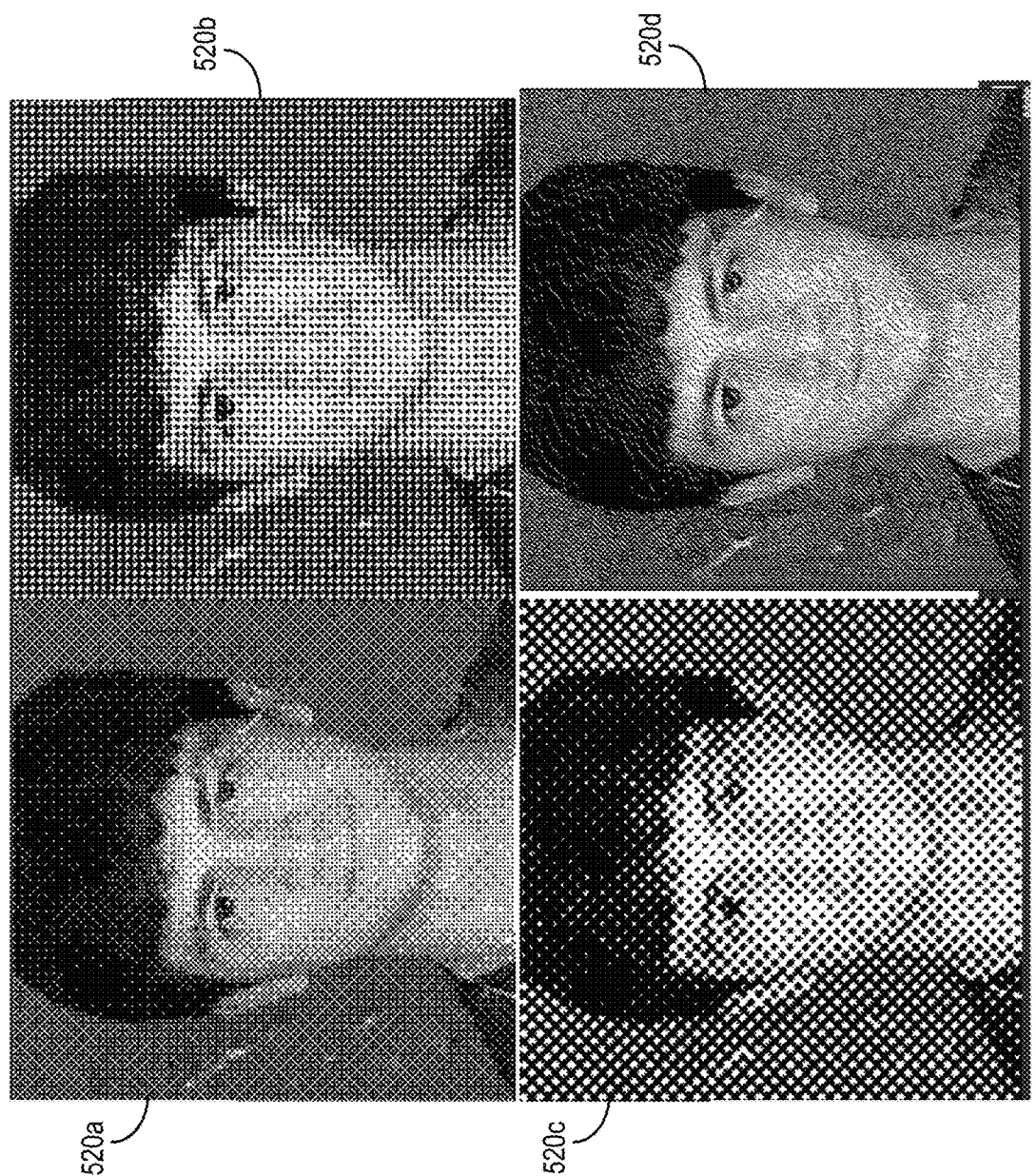

As mentioned above, in certain embodiments, the image restoration system 102 learns parameters for a defect detection neural network. In particular, the image restoration system 102 implements a training or a tuning process to learn parameters of a defect detection neural network that result in generating or predicting accurate segmentation masks. In some embodiments, the image restoration system 102 also generates customized sample digital images to utilize as part of the training process. FIGS. 5A-5C illustrate different steps in the process for generating sample defect digital images for training a defect detection neural network (e.g., the defect detection neural network 402) in accordance with one or more embodiments. Specifically, FIG. 5A illustrates an overview of generating sample defect digital images, while FIG. 5B and FIG. 5C provide additional detail for the specific acts involved. By utilizing the sample image generation method described in relation to FIGS. 5B and 5C, the image restoration system 102 generates realistic, natural, and challenging digital images for diverse, robust training that results in accurate performance.

As illustrated in FIG. 5A, the image restoration system 102 performs an act 502 to generate synthetic local defects. More specifically, the image restoration system 102 generates synthetic local defects by combining or blending local defect images with sample digital images. In some cases, a local defect image includes a digital image that depicts or portrays one or more local defects. For example, a local defect image depicts a pattern of scratches or tears without depicting anything else.

As shown, the image restoration system 102 blends a local defect image 506 with a sample digital image 504 (e.g., a sample digital image depicting a face). For instance, the image restoration system 102 utilizes a warp blending technique to blend the local defect image 506 with the sample digital image 504. Thus, the image restoration system 102 generates the blended defect digital image 508. In some cases, a blended defect digital image includes a digital image that depicts or portrays a face (or some other image) from a sample digital image combined with local defects from a local defect image. Additional detail regarding warping a defect digital image is provided below with reference to FIG. 5B.

As further illustrated in FIG. 5A, the image restoration system 102 performs an act 510 to utilize a synthetic aging algorithm. More particularly, the image restoration system 102 ages or "oldifies" the blended defect digital image 508 to further simulate or imitate old, historic images. In some cases, a synthetic aging algorithm includes one or more instructions, processes, or acts to artificially age a digital image (e.g., to make the digital image appear older).

As part of the synthetic aging algorithm, the image restoration system 102 performs an act 512 to blend the blended defect digital image 508 with one or more old paper digital images (e.g., digital images depicting aged, old pieces of paper). For example, the image restoration system 102 utilizes a blending method such as grain merging or dodge blending to blend an old paper digital image with the blended defect digital image 508. In some cases, the image restoration system 102 implements a blending method to only lighten various pixels of the blended defect digital image 508.

In some embodiments, as a further part of the synthetic aging algorithm, the image restoration system 102 also performs an act 514 to add degradation effects. In particular, the image restoration system 102 adds one or more degradation effects to the blended defect digital image 508 (before or after blending with an old paper digital image). In some embodiments, the image restoration system 102 adds degradation effects such as motion blur, focal blur, image noise, JPEG artifacts, and/or halftone artifacts. Indeed, in some cases, a degradation effect includes a visual effect or modification performed to a digital image to artificially make the digital image appear older or degraded.

By applying the synthetic aging algorithm via the act 512 and the act 514, the image restoration system 102 thus generates the sample defect digital image 515. As shown, the sample defect digital image 515 depicts a blurry, degraded, scratched version of the sample digital image 504. Indeed, the image restoration system 102 utilizes the sample defect digital image 515 for training purposes to learn parameters of the defect detection neural network 402. The image restoration system 102 further generates additional sample defect digital images to utilize for learning parameters of the defect detection neural network 402 as well (e.g., to include within a training set).

To generate multiple different sample defect digital images, the image restoration system 102 combines or merges different local defect images with different sample digital images. To increase robustness of the training, and to therefore improve the accuracy of the defect detection neural network 402, the image restoration system 102 generates multiple local defect digital images (e.g., with different patterns and/or locations of local defects) from a single local defect image to combine with a sample digital image (e.g., the sample digital image 504). FIG. 5B illustrates an example warping process to generate multiple local defect images from a single local defect image (e.g., the local defect image 506) for merging with a sample digital image (e.g., the sample digital image 504) in accordance with one or more embodiments.

As illustrated in FIG. 5B, the image restoration system 102 warps the local defect image 506 utilizing a particular warping technique. For example, as a first step in the warping process, the image restoration system 102 models the local defect image 506 as a grid (with a particular resolution or number of grid points) and shifts each grid point by a uniformly distributed random distance.

As a second step in the warping process, the image restoration system 102 defines a thin-plate-spline warping transform that warps the local defect image 506 from source points to target points. For instance, the image restoration system 102 utilizes the thin-plate-spline transform described by Fred L. Bookstein in *Principal Warps: Thin-Plate Splines and the Decomposition of Deformations*, IEEE Transactions on Pattern Analysis and Machine Intelligence, Vol. 11 No. 6 (1989), the entire contents of which are hereby incorporated by reference in their entirety.

Upon warping the local defect image 506, the image restoration system 102 further combines the warped local defect image with a sample digital image (e.g., the sample digital image 504). Particularly, the image restoration system 102 utilizes a particular blending method to blend pixels of a warped local defect image with pixels of a sample digital image. In some cases, the image restoration system 102 blends a sample digital image with a warped local defect image via a particular blending method such as Seamless Cloning in OpenCV.

For instance, as shown in FIG. 5B, the image restoration system 102 generates three warped local defect images 516a-516c from the local defect image 506. In addition, the image restoration system 102 blends each of the warped local defect images 516a-516c with the sample digital image 504 to generate the blended defect digital images 518a-518c. As shown, the blended defect digital image 518a depicts the face of the sample digital image 504 with the pattern of local defects depicted in the warped local defect image 516a. Similarly, the blended defect digital image 518b depicts the same face but with the pattern of local defects depicted by the warped local defect image 516b. Likewise, the blended defect digital image 518c depicts the same face, this time with the local defects of the warped local defect image 516c. As described above, the image restoration system 102 further applies a synthetic aging algorithm to the blended defect digital images 518a-508c to generate sample defect digital images for training a defect detection neural network.

As mentioned above, in certain embodiments, the image restoration system 102 adds degradation effects to blended defect digital images as part of a synthetic aging algorithm. In particular, the image restoration system 102 adds degradation effects such as halftone artifacts. FIG. 5C illustrates example halftone artifacts that the image restoration system 102 generates and combines with blended defect digital images in accordance with one or more embodiments.

As illustrated in FIG. 5C, the image restoration system 102 generates different types of halftone artifact patterns. For example, the image restoration system 102 generates halftone artifacts such as the Bayer's Dispersed Dot pattern, the Bayer's Clustered Dot pattern, Ulichney's Clustered Dot pattern, Ulichney's Dispersed Dot pattern, and an error diffusion pattern. As shown, the image restoration system 102 adds these halftone artifact patterns to blended defect digital images to generate the sample defect digital images 520a-520d. Each of the sample defect digital images 520a-520d depicts a different type of halftone artifact pattern.

Not only does the image restoration system 102 add halftone artifacts, but the image restoration system 102 adds other degradation as part of the synthetic aging algorithm effects as well. For example, the image restoration system 102 adds motion blur to blur a blended defect digital image as if the camera was in motion at the time of capture. In some case, the image restoration system 102 adds focal blur to blur a blended defect digital image as if a camera lens was out of focus at the time of capture. In these or other cases, the image restoration system 102 adds noise and/or JPEG artifacts to blended defect digital images as well. Additionally (or alternatively), and as discussed above, the image restoration system 102 blends the blended defect digital images with old paper digital images as part of the synthetic aging algorithm.

Upon generating a set of sample defect digital images for training, the image restoration system 102 trains the defect detection neural network 402. In particular, the image restoration system 102 repeats a number of acts of a training process for a number of epochs (e.g., 200 epochs) and/or until the defect detection neural network 402 generates accurate segmentation masks. As a first act in the training process, the image restoration system 102 inputs a sample defect digital image into the defect detection neural network 402. In response, the defect detection neural network 402 generates a predicted output in the form of a predicted segmentation mask indicating predicted locations of the local defects.

As a second act in the training process, the image restoration system 102 compares the predicted segmentation mask with a ground truth segmentation mask (e.g., a segmentation mask indicating locations of local defects within a local defect image from which the sample defect digital image is generated). Based on the comparison, the image restoration system 102 determines an error or a measure of loss associated with the defect detection neural network. For example, the image restoration system 102 utilizes a particular loss function as part of the comparison, such as a Dice loss function. Indeed, the image restoration system 102 utilizes a Dice loss in some embodiments because the predicted classes for pixels (e.g., indicating pixels that are part of a local defect vs. pixels that are not part of a local defect) are unbalanced. In some cases, the Dice loss function is given by:

$$\text{Dice} = \frac{2|A \cap B|}{|A| + |B|}$$

where Dice represents the Dice coefficient, which a measure of overlap between two samples (e.g., a predicted segmentation mask and a ground truth segmentation mask), ranging from 0 to 1, with 1 representing complete overlap. In the above equation, A represents a set of pixels indicating local defects given by a predicted segmentation mask while B represents a set of pixels indicating local defects within a ground truth segmentation mask. Therefore, |A| represents the number of elements inside A, |B| represents the number of elements inside B, and |A∩| represents the common elements between sets A and B.

As a third act of the training process, the image restoration system 102 adjusts or modifies parameters (e.g., weights) associated with various layers and blocks of the defect detection neural network 402. Indeed, the image restoration system 102 modifies parameters to reduce the measure of loss determined by the loss function above. For instance, the image restoration system 102 modifies weights that affect how layers analyze or process data within the defect detection neural network 402 to reduce the measure of loss.

As mentioned, the image restoration system 102 further repeats the described training acts or steps for multiple iterations or epochs, inputting different sample defect digital images into the defect detection neural network 402 to generate new predicted segmentation masks, determining new losses, and reducing the losses by modifying parameters each time around (e.g., until the measure of loss satisfies a threshold measure of loss). For instance, the image restoration system 102 utilizes a set of sample defect digital images including 4000 sample defect digital images (including color images and black-and-white images) in varying resolutions and depicting different objects such as face portraits, random objects, landscapes, and family groups. In the image restoration system 102 further utilizes around 100 different synthetic local defects and around 150 old paper digital images for blending with sample digital images.

In one or more embodiments, the image restoration system 102 utilizes a particular set of training images to learn parameters for the defect detection neural network 402. For example, the image restoration system 102 utilizes the DIV2K dataset described by Eirikur Agustsson and Radu Timofte in *NTIRE 2017 Challenge on Single Image Super-Resolution: Dataset and Study*, IEEE Conference on Computer Vision and Pattern Recognition (2017), the CelebHQ dataset described by Ziwei Liu, Ping Luo, Xiaogang Wang, and Xiaoou Tang in *Deep Learning Face Attributes in the Wild*, Proceedings of the Int'l Conference on Computer Vision (2015), and/or the ImageNet dataset described by Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei in *ImageNet Large Scale Visual Recognition Challenge*, IJCV (2015).

As mentioned above, in certain described embodiments, the image restoration system 102 outperforms conventional systems in accuracy of detecting local defects. Indeed, researchers have performed experiments to demonstrate the improvements of the image restoration system 102 in more accurately determining locations of local defects within digital images. FIG. 6 illustrates a table 602 of performance metrics comparing the image restoration system 102 against a number of conventional systems in accordance with one or more embodiments.

As illustrated in FIG. 6, the table 602 indicates that the image restoration system 102 achieves the highest mean intersection over union (mIoU) performance metric at 0.73, compared to a next-highest of 0.63 for the DeepLab system. To obtain the results of the table 602, researchers performed an experiment on a test dataset of 37 manually annotated digital images of old photos with various local defects. The researchers trained each of the systems in the table 602 using 128×128 patches over 200 epochs with a learning rate of 0.0001 with learning rate decay. As shown, the image restoration system 102 outperforms a "Prior Image Editing System," the DeepLab v3 system described by Liang-Chieh Chen, George Papandreou, Florian Schroff, and Hartwig Adam in *Rethinking Atrous Convolution for Semantic Image Segmentation*, arXiv: 1706.05587v3 (2017), the Unet system described by Olaf Ronneberger, Philipp Fischer, and Thomas Brox in *U-Net: Convolutional Networks for Biomedical Image Segmentation*, arXiv: 1505.04597v1 (2015), and the Segnet system described by Vijay Badrinarayanan, Alex Kendall, and Roberto Cipolla in *Segnet: A Deep Convolutional Encoder-Decoder Architecture for Image Segmentation*, arXiv. 1511.00561v3 (2016).

As a result of its improved local defect detection, the image restoration system 102 also generates more accurate modified digital images. In particular, the image restoration system 102 inpaints the identified local defects to more accurately and more realistically restore degraded digital images. Indeed, by more accurately detecting local defects, the image restoration system 102 is thereby able to more accurately repair those local defects.

Figure 7:
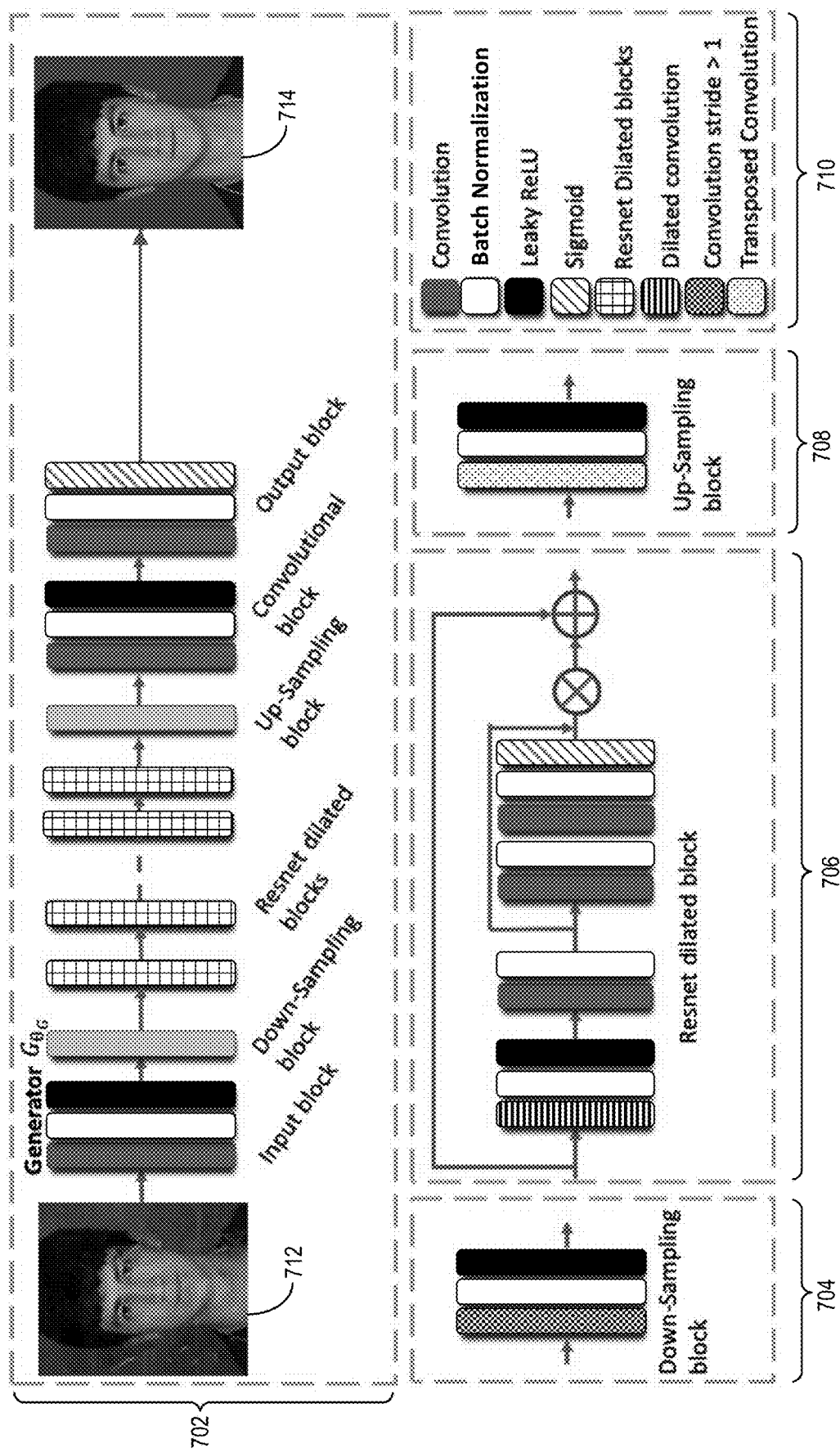
FIG. 7 illustrates an example network architecture for, and process of utilizing, a global correction neural network in accordance with one or more embodiments.

As mentioned, in certain described embodiments, the image restoration system 102 corrects global imperfections as well as local defects. In particular, the image restoration system 102 utilizes a global correction neural network to correct global imperfections depicted within digital images in a pixel-by-pixel approach. FIG. 7 illustrates an example architecture for a global correction neural network 702, along with details for various constituent layers and components of the global correction neural network 702 in accordance with one or more embodiments.

As illustrated in FIG. 7, the image restoration system 102 utilizes the global correction neural network 702 to identify and correct global imperfections within the digital image 712 (e.g., a degraded digital image without local defects repaired or an intermediate modified digital image with local defects repaired). More specifically, the image restoration system 102 utilizes the global correction neural network 702 to extract a feature vector from the digital image 712. Indeed, the image restoration system 102 utilizes a generator (e.g., a feed-forward convolutional neural network) of the global correction neural network 702 to extract a feature vector. Within the generator, there are various blocks such as the input block the down-sampling block, and the Resnet dilated blocks for extracting the feature vector. In addition, the global correction neural network 702 modifies the feature vector to generate an output in the form of a modified digital image 714.

As shown, the key 710 indicates the various constituent blocks of the global correction neural network 702 and their functions, such as convolution blocks, sigmoid blocks, and batch normalization blocks, among others. In addition, FIG. 7 also illustrates details for a down-sampling block within the section 704, details for a Resnet dilated block in the section 706, and details for an up-sampling block in the section 708. As shown, the down-sampling block, the Resnet dilated block, and the up-sampling block each include a number of internal blocks themselves (the types of which are indicated by the key 710).

To correct global imperfections, the global correction neural network 702 utilizes an input block to receive a W×H×3 digital image (e.g., the digital image 712). In some implementations, the input block is part of an encoder of the generator that encodes input data from digital images into feature vectors of latent image features from the image. and an output block that includes a sigmoid function to normalize output values on a [0, 1] interval. After the input block, the global correction neural network 702 includes a down-sampling block to reduce the size of the input.

The architecture continues with seven dilated residual blocks (e.g., as shown in section 706), where each dilated residual blocks includes a channel attention mechanism to feature maps from convolution layers such that different features are weighted differently according to global statistics of activations. In order to take information from different scales, the blocks include dilated convolutions that help to reach a global contextual consistency in the spatial domain. By implementing such attention mechanisms and dilated convolutions, the global correction neural network 702 weights features to "pay attention to" (e.g., more heavily weight) and correct global imperfections while refraining from adjusting or modifying other aspects of the digital image 712, such as local defects.

In addition, the image restoration system 102 modifies the feature vector to reduce the appearance of any global imperfections depicted within the digital image 712. Indeed, the image restoration system 102 generates the modified digital image 714 by modifying an extracted feature vector that results in a clean version (e.g., with removed or reduced global imperfections) of the digital image 712. Indeed, the image restoration system 102 utilizes the global correction neural network 702 to modify the extracted feature vector according to weights and attention mechanisms of the various layers within the global correction neural network 702.

Figure 8:
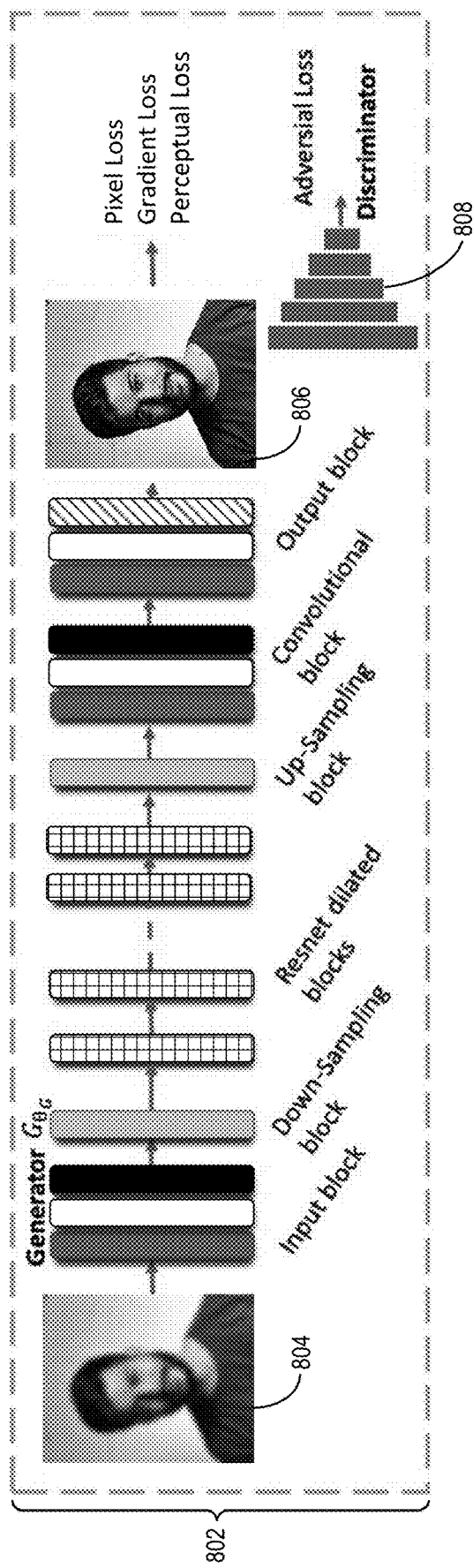
FIG. 8 illustrates an example of learning parameters for a global correction neural network in accordance with one or more embodiments.

In some embodiments, to accurately generate clean modified digital images, the global correction neural network 702 includes parameters learned from a training process. Indeed, the image restoration system 102 trains the global correction neural network 702 to correct global imperfections from a set of sample digital images. FIG. 8 illustrates training a global correction neural network 802 (e.g., the global correction neural network 702) in accordance with one or more embodiments.

As illustrated in FIG. 8, the global correction neural network 802 includes the layers and blocks described above in relation to FIG. 7. As part of the training process, the image restoration system 102 inputs a sample digital image 804 into the global correction neural network 802. In turn, the global correction neural network 802 processes the digital image 804 to extract a feature vector representing the digital image 804. In addition, the global correction neural network 802 modifies the feature vector to generate a predicted digital image 806.

As shown, each block utilizes batch normalization to accelerate the training of the global correction neural network 802. This is especially beneficial to include within the discriminator 808 for training the global correction neural network 802 to stabilize adversarial learning and to prevent mode collapse due to poor initialization. Internally, batch normalization preserves content-related information by reducing covariance shift within mini-batches during training. In some cases, the image restoration system 102 utilizes the internal mean and variance of the batch to normalize each feature channel.

As also shown, the global correction neural network 802 includes the Resnet dilated blocks. In general, the Resnet dilated blocks focus on the regions of an image that include global imperfections. In some implementations, the Resnet dilated blocks are part of an encoder of the generator (along with the input block and down-sampling block).

In various implementations, the Resnet dilated blocks include multiple layers, portions, or components. In one or more implementations, each Resnet dilated block contains a channel attention mechanism. For instance, the channel attention mechanism weights the feature vectors from convolutional layers according to global statistics of the activations such that different features are weighted differently. Indeed, the Resnet dilated blocks utilize the channel attention mechanism to learn weight amounts to apply to each feature in the feature vectors.

In one or more implementations, the Resnet dilated blocks include dilated convolutions that learn information from different scales. As mentioned above, the Resnet dilated blocks utilize the dilated convolutions to assist the network in reaching a global contextual consistency in the spatial domain. Additionally, in various implementations, the dilated convolutions are learned differently (e.g., separately from each other). Further, in some implementations, the image restoration system 102 applies different blocks of the Resnet dilated blocks (and thus, their differently weighted dilated convolutions) based on a learned correspondence to various global imperfections.

As shown, the global correction neural network 802 also includes the output block. In various implementations, the output block forms (or is part of) a decoder that up-samples a feature vector back to an initial resolution for generating output. Additionally, in one or more implementations, the output block normalizes the encoded feature vectors received from the Resnet dilated blocks. For example, the output block utilizes an activation function, such as a sigmoid function, to normalize the output values (e.g., feature vectors) to a set interval (e.g., [0-1]). In addition, for each input image (e.g., the digital image 804), the output block outputs a predicted digital image (e.g., the predicted digital image 806).

To learn parameters of the global correction neural network 802 that result in generating clean versions of input images (e.g., by reducing global imperfections), the image restoration system 102 utilizes a discriminator 808 and one or more loss functions. Indeed, the image restoration system 102 utilizes the discriminator 808 and various loss functions to determine whether or not the global correction neural network 802 is generating accurate predicted digital images that look clean of global imperfections.

As mentioned, to learn parameters that reduce appearance of global imperfections, the image restoration system 102 utilizes various loss functions. In addition, the image restoration system 102 modifies parameters of global correction neural network 802 to reduce one or more measures of loss as part of the training process. This process repeats, inputting new sample digital images, generating new predicted digital images, determining losses, and modifying parameters to reduce the losses, until one or more of the measures of loss satisfies a respective loss threshold (indicating the predicted digital images are accurate).

For example, the image restoration system 102 reduces the similarity between the predicted digital image 806 and a ground truth digital image (e.g., a ground truth digital image depicting an actual clean version of the digital image 804) utilizing a pixel loss and a gradient loss. Indeed, the image restoration system 102 utilizes the pixel loss and the gradient loss to encourage or motivate the global correction neural network 802 to generate the predicted digital image 806 to generate an improved version of the digital image 804 that was input in the first place (rather than an exact reconstruction), by reducing the appearance of global imperfections. In some cases, the image restoration system 102 utilizes a pixel loss given by:

$$L_{Pixel} = \|\hat{T} - T\|$$

where $L_{Pixel}$ represents the pixel loss, T represents a ground truth digital image, and $\hat{T}$ represents the predicted digital image 806. In one or more implementations, the image restoration system 102 utilizes the pixel loss to represent the differences between pixels of the predicted digital image 806 and corresponding pixels of a ground truth digital image. In some cases, the image restoration system 102 sets the weights of the pixel loss function to a value of 1.0.

In some implementations, the image restoration system 102 further (or alternatively) utilizes a perceptual loss and a relativistic adversarial loss to improve the perceptual quality of the predicted digital image 806. For instance, the image restoration system 102 utilizes a perceptual loss function to measure the perceptual loss between the predicted digital image 806 and a corresponding ground truth digital image. In various implementations, utilizing perceptual loss preserves the original content and perceptual quality of the ground truth digital image. For example, the image restoration system 102 measures a perceptual loss amount by comparing feature representations between the predicted digital image 806 and the ground truth digital image.

In one or more implementations, the image restoration system 102 measures the perceptual loss between the images at different levels, (e.g., at different layers of a VGG network). In some cases, the image restoration system 102 combines the loss at each level to formulate the perceptual loss. The image restoration system 102 then utilizes the perceptual loss (in part) to learn parameters for the global correction neural network 802 to maintain feature representation similarities between predicted digital images and ground truth digital images. For instance, the image restoration system 102 determines a perceptual loss given by:

$$\mathcal{L}_{Perceptual} = \sum_i \left\| L_{\underline{Perceptual}_i}(\hat{T}) - L_{\underline{Perceptual}_i}(T) \right\|$$

$$\mathcal{L}_{Perceptual/i/j} = \frac{1}{W_{i,j}H_{i,j}C_{i,j}} \sum_{x=1}^{W_{i,j}} \sum_{y=1}^{H_{i,j}} \sum_{z=1}^{C_{i,j}} \left\| \Phi_{i,j}(\hat{T}) - \Phi_{i,j}(T) \right\|$$

where $\Phi_{i,j}(\bullet)$ represents a feature map obtained after different convolutional layers of the global correction neural network 802. Using the above equations, the image restoration system 102 can determine the perceptual loss based on measuring the distance (e.g., Euclidean distance in multidimensional vector space) between the feature representations of the predicted digital image 806 and the ground truth digital image. In some embodiments, i and j represent the different convolutional layers and feature maps produced by an activation component (e.g., a rectified linear unit or "ReLU"). Further, C may represent the number of channels of the produced feature maps, H may represent the height of the produced feature maps, and W may represent the weight of the produced feature maps. In some implementations, the image restoration system 102 sets the weights in the perceptual loss function to 2.0.

In various implementations, the image restoration system 102 combines the pixel loss and the perceptual loss into a multi-term loss. In one or more implementations, the image restoration system 102 utilizes the combined loss the learn parameters for the global correction neural network 802 to generate better quality images. For example, the image restoration system 102 back propagates to tune the parameters and weights of the global correction neural network 802 to minimize future loss. For instance, the image restoration system 102 seeks to minimize or reduce distances between predicted digital images and corresponding ground truth digital images in a feature space.

As mentioned above, the image restoration system 102 utilizes a discriminator 808 as part of an adversarial training process for the global correction neural network 802. For instance, the discriminator 808 and the generator of the global correction neural network 802 are in competition with one another, where the generator attempts to generate predicted digital images that fool the discriminator 808 into determining that the predicted digital images are real (e.g., genuine, stored, non-predicted) digital images. In some cases, the discriminator 808 is a 70×70 PatchGAN with a fully convolutional architecture of e64:e128:e256:e512.

The image restoration system 102 utilizes an adversarial loss to improve the ability of the discriminator 808 to predict real or fake images. For example, the image restoration system 102 utilizes the adversarial loss to modify or adjust parameters of the global correction neural network 802 (e.g., to reduce the adversarial loss). In various implementations, the image restoration system 102 utilizes the adversarial loss to tune the global correction neural network 802 (e.g., by modifying parameters to reduce the adversarial loss).

In addition, the image restoration system 102 utilizes an adversarial loss as part of the adversarial training to determine measure of loss (or a measure of accuracy) indicating how accurately the global correction neural network 802 generates a predicted digital image (e.g., the predicted digital image 806) that resembles an actual, stored digital image. In some cases, the image restoration system 102 utilizes a relativistic adversarial loss represented by two separate adversarial loss functions, one for the generator of the global correction neural network 802 and one for the discriminator 808, as given by:

$$\mathcal{L}_{Adversarial}{}^G = -\mathbb{E}_{(x_r, x_f) \sim (P, Q)}[\log(\sigma(C(x_f) - C(x_r)))]$$

$$\mathcal{L}_{Adversarial}{}^D = -\mathbb{E}_{(x_r, x_f) \sim (P, Q)}[\log(\sigma(C(x_r) - C(x_f)))]$$

where $\mathcal{L}_{Adversarial}{}^G$ represents an adversarial loss for the generator of the global correction neural network 802 and $\mathcal{L}_{Adversarial}{}^D$ represents an adversarial loss for the discriminator 808. In some cases, the image restoration system 102 applies a minimax loss objective function between the generator loss and the discriminator loss above to train both the generator and the discriminator 808 together. For instance, in one or more implementations, the image restoration system 102 trains the generator and the discriminator 808 simultaneously by minimizing the generator loss and maximizing the discriminator loss. In one or more embodiments, the image restoration system 102 sets the weights of the above adversarial loss functions to 0.01.

In various implementations, the discriminator 808 utilizes a patch-based architecture that includes both a local discriminator and a global discriminator. For example, the image restoration system 102 employs a PatchGAN architecture that determines and penalizes differences based on changes at local image patches. Indeed, in some implementations, the discriminator 808 classifies each patch within a predicted digital image 806 as real or fake, then averages the classifications across the patches to provide a final output.

Figure 9:
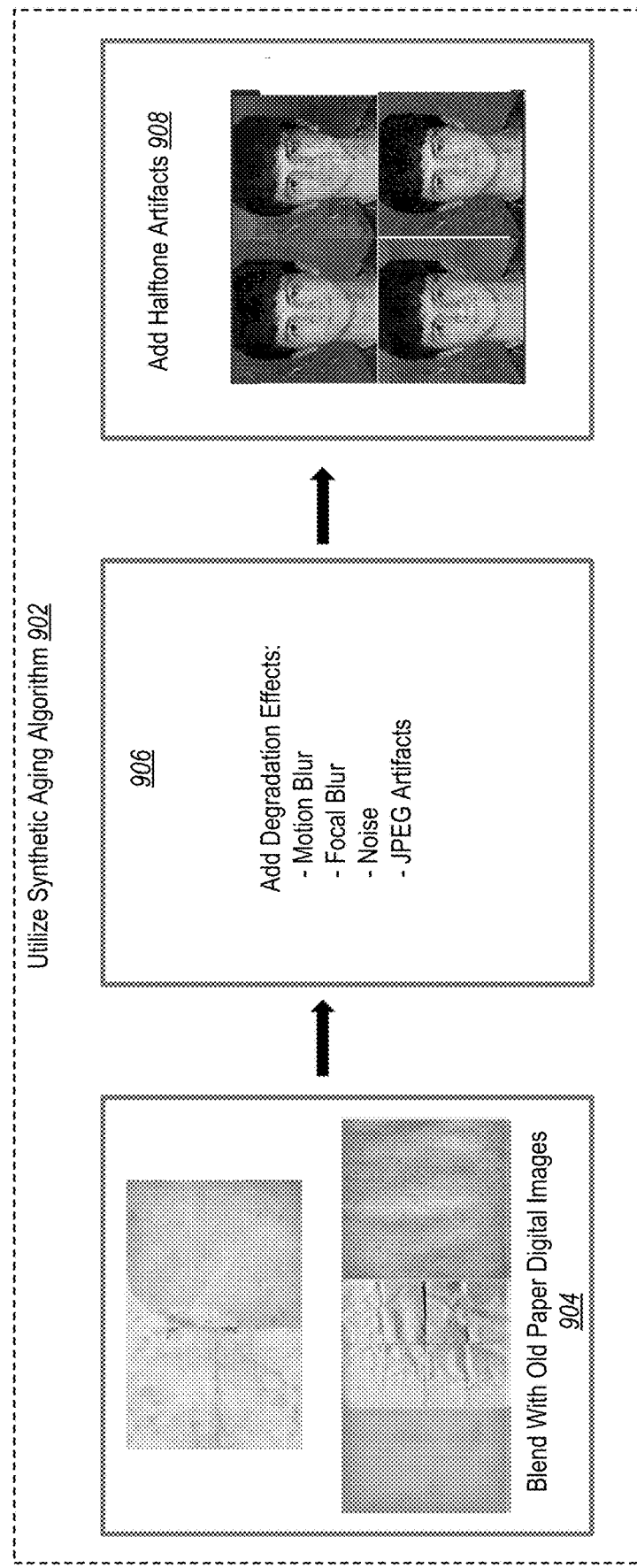
FIG. 9 illustrates an example process for generating a dataset of sample imperfection digital image for learning parameters of a global correction neural network in accordance with one or more embodiments.

To train the global correction neural network 802, in some embodiments, the image restoration system 102 generates a synthetic dataset. In particular, the image restoration system 102 generates a set of sample imperfection digital images and corresponding ground truth clean digital images. FIG. 9 illustrates an example sequence of acts for generating sample imperfection digital images in accordance with one or more embodiments.

As illustrated in FIG. 9, the image restoration system 102 performs an act 902 to utilize a synthetic aging algorithm to generate a sample imperfection digital image (e.g., a digital image with synthesized global imperfections). More specifically, the image restoration system 102 performs an act 904 to blend a sample digital image (e.g., a digital image of a face portrait) with one or more old paper digital images. For instance, the image restoration system 102 utilizes a particular blending technique to combine the sample digital image with an old paper digital image, thereby making the sample digital image appear older and more degraded.

In addition, the image restoration system 102 performs an act 906 to add degradation effects. In particular, the image restoration system 102 adds degradation effects to a sample digital image (e.g., a sample digital image blended with an old paper digital image). For example, the image restoration system 102 adds degradation effects such as motion blur, focal blur, image noise, and JPEG artifacts. In some embodiments, the image restoration system 102 adds degradation effects to only a subset of sample digital images.

As further illustrated in FIG. 9, the image restoration system 102 performs an act 908 to add halftone artifacts to a sample digital images (e.g., a sample digital image blended with an old paper digital image and with added degradation effects). In some cases, the image restoration system 102 adds halftone artifacts to only half of the sample digital image utilized for training the global correction neural network 802. Through the illustrated process of FIG. 9, the image restoration system 102 generates sample imperfection digital images for training the global correction neural network 802.

Figure 10:
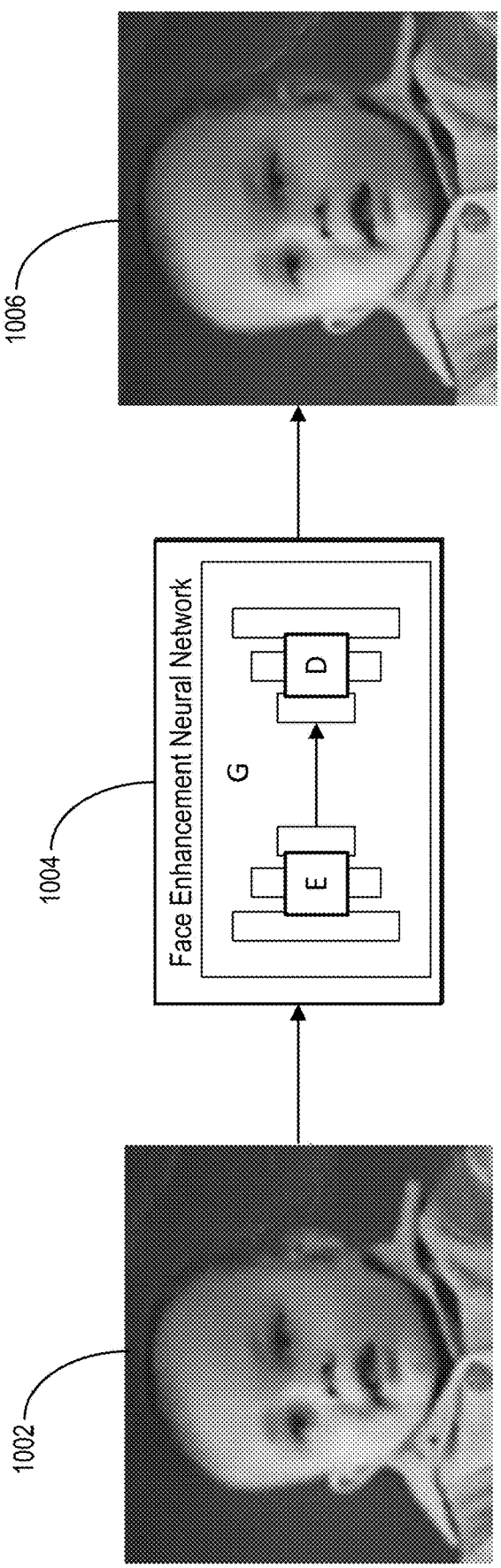
FIG. 10 illustrates an example of utilizing a face enhancement neural network to generate an enhanced face image in accordance with one or more embodiments.

As mentioned above, in certain described embodiments, the image restoration system 102 enhances faces depicted within an initial digital image. In particular, the image restoration system 102 utilizes a face enhancement neural network to enhance pixels of an area of a digital image that depicts a face. FIG. 10 illustrates utilizing a face enhancement neural network 1004 to enhance a face depicted within a digital image 1002 (e.g., the digital image portion 212 or a modified digital image generated via a defect neural network and/or a global correction neural network) to generate the enhance face image 1006 (e.g., the enhanced face image 216).

As illustrated in FIG. 10, the image restoration system 102 inputs the digital image 1002 into the face enhancement neural network 1004. In turn, the face enhancement neural network 1004 generates the enhanced face image 1006 that depicts a sharper image with more clearly distinguishable visual features such as the eyes, nose, mouth, shirt collar, and button. In one or more implementations, the face enhancement neural network 1004 is a StyleGAN generative neural network ("G") that includes an encoder ("E") and a decoder ("D").

In certain instances, the image restoration system 102 utilizes a GAN (as the image-generating-neural network) that utilizes a neural network encoder E to convert a random latent vector (e.g., a Z vector with a Z-space) to a latent vector that represents a face. Subsequently, in some embodiments, the GAN (utilized by the image projection system) uses a neural network decoder D to convert the latent vector that represents the face to a generated (or constructed) digital image. Indeed, in one or more embodiments, the GAN (utilized by the image projection system) is learned using facial images to generate facial digital images (e.g., portrait images depicting a person). As an example, in some embodiments, the image restoration system 102 utilizes a StyleGAN as described by R. Abdal et al. in *A Style-Based StyleFlow: Attribute-conditioned Exploration of StyleGAN-Generated Images using Conditional Continuous Normalizing Flows*, arXiv: 2008.02401, (2020), the content of which is hereby incorporated by reference in its entirety (hereinafter *A Style-Based StyleFlow*). Another example of a GAN includes a StyleGAN2 described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety (hereinafter *Karras*).

Moreover, as used herein, the term latent vector or latent code refers to data that embeds latent (or hidden) features of a digital image that, when processed with face enhancement neural network 1004, converts into a digital image depicting the features. For instance, a latent code includes one or more latent-feature vectors or one or more noise maps that, when utilized with a face enhancement neural network 1004, convert into a digital image of a face. In certain instances, the image restoration system 102 utilizes a latent code to generate an image and/or a modified version of an image utilizing the face enhancement neural network 1004. In some instances, a latent vector includes a Z-vector of a GAN (as described in *A Style-Based StyleFlow* and Karras). In addition, in one or more embodiments, a latent vector includes a latent-feature vector and/or a noise map from a latent-noise space as described by R. Abdal et al. in *Image2StyleGAN: How to embed images into the stylegan latent space?*, In Proceedings of the IEEE International Conference on Computer Vision, pages 4432-4441, 2019, the content of which is hereby incorporated by reference in its entirety (hereinafter *Image2StyleGAN*). Furthermore, in certain instances, a latent code is within a latent space (WN latent-noise space and/or W+N latent-noise space) as described by R. Abdal et al. in *Image2StyleGAN++: How to edit the embedded images?*, In Proceedings of the IEEE International Conference on Computer Vision, pages 8296-8305, 2020, the content of which is hereby incorporated by reference in its entirety (hereinafter *Image2StyleGAN++*).

Moreover, in one or more embodiments, the image restoration system 102 generates (or identifies) a latent code by projecting an initialization image into a latent vector (of a latent space). More specifically, in some embodiments, the image projection system learns a latent code from a latent vector (e.g., a random latent vector) by iteratively modifying the latent vector for a number of learning iterations until a modified version of the latent vector, when utilized with a decoder of the face enhancement neural network 1004, converts into a reconstructed version of the initialization image. In one or more embodiments, the image restoration system 102 trains the face enhancement neural network 1004 is on a dataset of real face images such as the Flickr-Faces-High-Quality or "FFHQ" dataset (e.g., initialization images).

To generate the enhanced face image 1006, the image restoration system 102 utilizes the face enhancement neural network 1004 to project or map the digital image 1002 into the learned latent space. Specifically, the face enhancement neural network 1004 maps the digital image 1002 into a latent space generated or learned via a training process described above. In other words, the image restoration system 102 determines, within the latent space, a latent code that corresponds to the digital image 1002 (will result in a reproduction of the digital image 1002). In some cases, the image restoration system 102 determines a corresponding latent code as a closest or nearest (e.g., based on Euclidean distance) latent code within the latent space. In these or other cases, the image restoration system 102 determines a corresponding latent code according to the following objective function:

$$z^* = \mathrm{argmin} |G(z) - x|_2$$

where x represents the target digital image 1002, G (z) represents an image generated from the latent space (or a latent codes) by the face enhancement neural network 1004 ("G") from noise z, and z* represents a latent code that will reproduce an enhanced face image 1006. Thus, the image restoration system 102 utilizes the face enhancement neural network 1004 to determine a latent code z* that satisfies the above objective function (e.g., by finding a G(z) that minimizes a difference or distance from x). In addition, the image restoration system 102 utilizes the face enhancement neural network 1004 to generate the enhanced face image 1006 (represented by G (z*)) from the nearest latent code z*.

In other words, the image restoration system 102 finds the latent code z* in the learned latent space that will reproduce an image closest to the target digital image 1002. Because the face enhancement neural network 1004 is trained to generate enhanced faces, when the face enhancement neural network 1004 generates a face from the latent code z*, the resulting face will look similar to the face in the digital image 1002 only with enhanced features.

Figure 11:
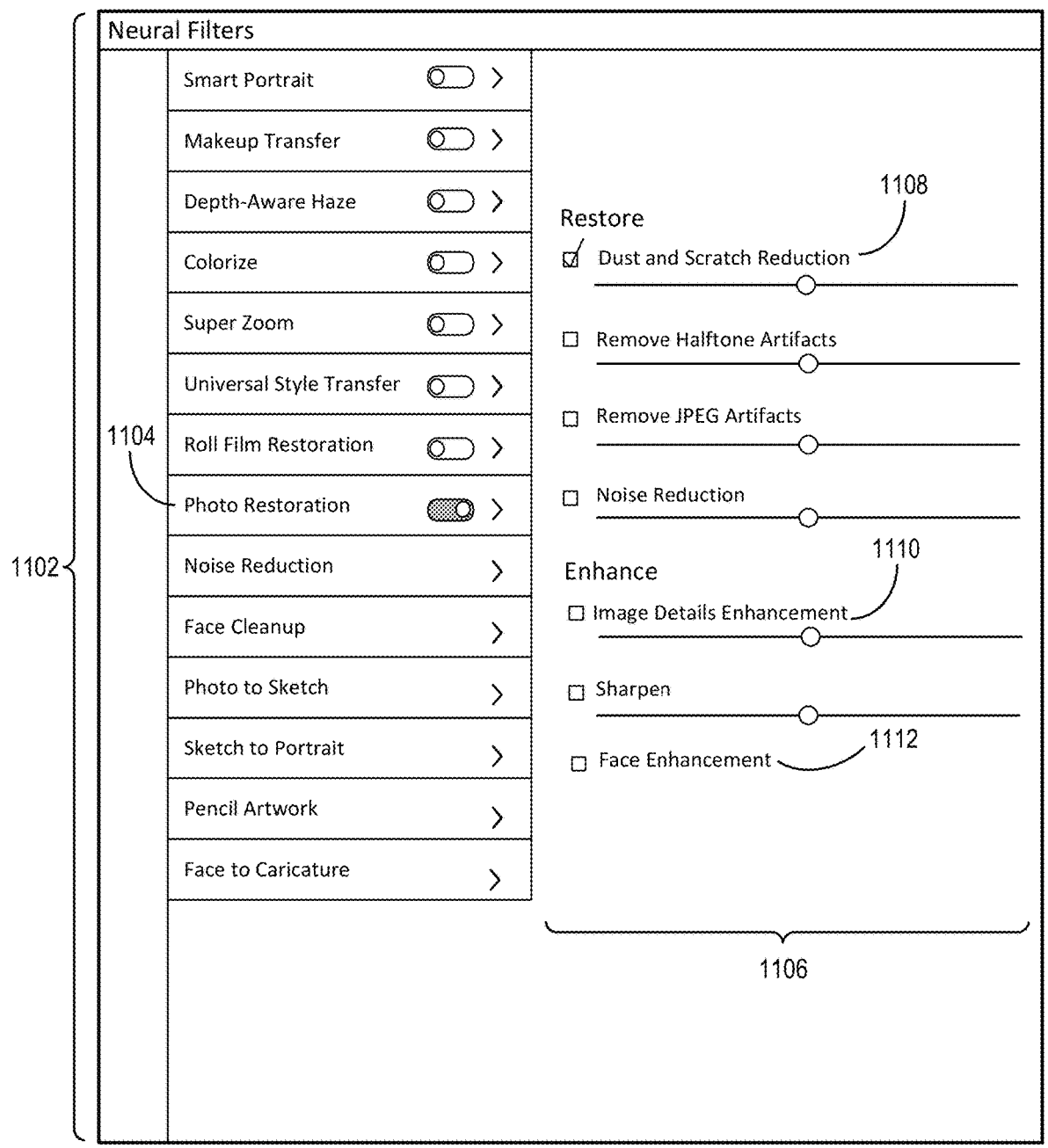
FIG. 11 illustrates an example image restoration interface for selecting and adjusting image restoration techniques to apply to a digital image in accordance with one or more embodiments.

In certain described embodiments, the image restoration system 102 receives indications of user interactions for generating and/or modifying digital images. In particular, the image restoration system 102 provides an image restoration interface whereby the image restoration system 102 receives user inputs to repair local defects, correct global imperfections, and/or enhance depicted faces within digital images. FIG. 11 illustrates an example image restoration interface 1102 in accordance with one or more embodiments.

As illustrated in FIG. 11, the image restoration system 102 generates and provides an image restoration interface 1102 for display on the client device 108. In particular, the image restoration system 102 receives or detects a user interaction selecting the restoration interface element 1104 to initiate the display of the image restoration interface 1102 (e.g., by clicking the option or toggling the switch). As shown, the image restoration interface 1102 includes a number of restoration elements 1106, such as a local defect reduction element 1108 ("Dust and Scratch Reduction"), a global imperfection correction element 1110 ("Image Details Enhancement"), and a face enhancement element 1112 ("Face Enhancement"). The image restoration interface 1102 includes other elements as well, for performing various image modifications such as "Remove Halftone Artifacts," "Remove JPEG Artifacts," "Noise Reduction," and "Sharpen."

As shown, the image restoration interface 1102 includes selectable checkboxes for each of the restoration elements 1106. Based on user interaction selecting a checkbox, the image restoration system 102 applies the corresponding image restoration technique. In some cases, the image restoration system 102 receives user interactions selecting more than one checkbox to modify a single digital image. Thus, the image restoration system 102 can repair local defects, correct global imperfections, and/or enhance depicted faces for a single image based on determining which checkboxes are selected.

As further shown in FIG. 11, the local defect reduction element 1108 and the global imperfection correction element 1110 each include a respective slider bar. Based on user interaction sliding the slider element along the slider bar, the image restoration system 102 increases or decreases a measure or degree of modification applied to a digital image. For example, based on user interaction sliding the local defect reduction element 1108 to the left, the image restoration system 102 reduces an area of the digital image to analyze and repair for local defects. Specifically, the image restoration system 102 modifies a size of the segmentation mask generated by the defect detection neural network 402. In some cases, when the element is all the way to the left, the image restoration system 102 utilizes the actual segmentation mask, while the image restoration system 102 utilizes various morphological operations to increase the detection area for the segmentation mask for other positions of the element. Indeed, based on user interaction sliding the element to the right, the image restoration system 102 increases the detection area by, for example, increasing the size of the segmentation mask.

Based on user interaction adjusting the global imperfection correction element 1110, the image restoration system 102 modifies a measure of correction applied to a digital image. For example, the image restoration system 102 modifies the weights for various attention mechanisms of the residual layers of a global correction neural network (e.g., the global correction neural network 702 or 802) to add more or less emphasis on the global imperfections (depending on whether the element is moved left or right). As another example, the image restoration system 102 modifies an area of a digital image for which to correct global imperfections based on user interaction with the element (e.g., where sliding to the right increases the area and sliding to the left decreases the area).

In some embodiments, the image restoration system 102 also (or alternatively) receives user interaction with the face enhancement element 1112. For example, the image restoration system 102 receives user interaction selecting the checkbox, whereupon the image restoration system 102 prompts the user to indicated (e.g., select or click) which face or faces in the digital image to enhance. Based on receiving user interaction indicating a particular face, the image restoration system 102 determines an area of pixels including the face and utilizes the face enhancement neural network 1004 to enhance the depiction of the face.

As mentioned above, in certain embodiments, the image restoration system 102 improves the quality and appearance of a degraded digital image through one or more of repairing local defects, correcting global imperfections, or enhancing depicted faces. In particular, the image restoration system 102 utilizes various neural network architectures described herein, such as a defect detection neural network, a global correction neural network, and a face enhancement neural network. FIG. 12 illustrates an example result from utilizing a defect detection neural network, a global correction, and a face enhancement neural network to restore a digital image.

As illustrated in FIG. 12, the degraded digital image 1202 depicts a number of local defects such as scratches and folds. In addition, the degraded digital image 1202 depicts global imperfections such as blurriness. The image restoration system 102 therefore restores the degraded digital image 1202 to generate the modified, restored digital image 1204 by utilizing a defect detection neural network to repair local defects, a global correction neural network to correct global imperfections, and a face enhancement neural network to enhance pixels depicting the face in accordance with this disclosure.

Figure 13:
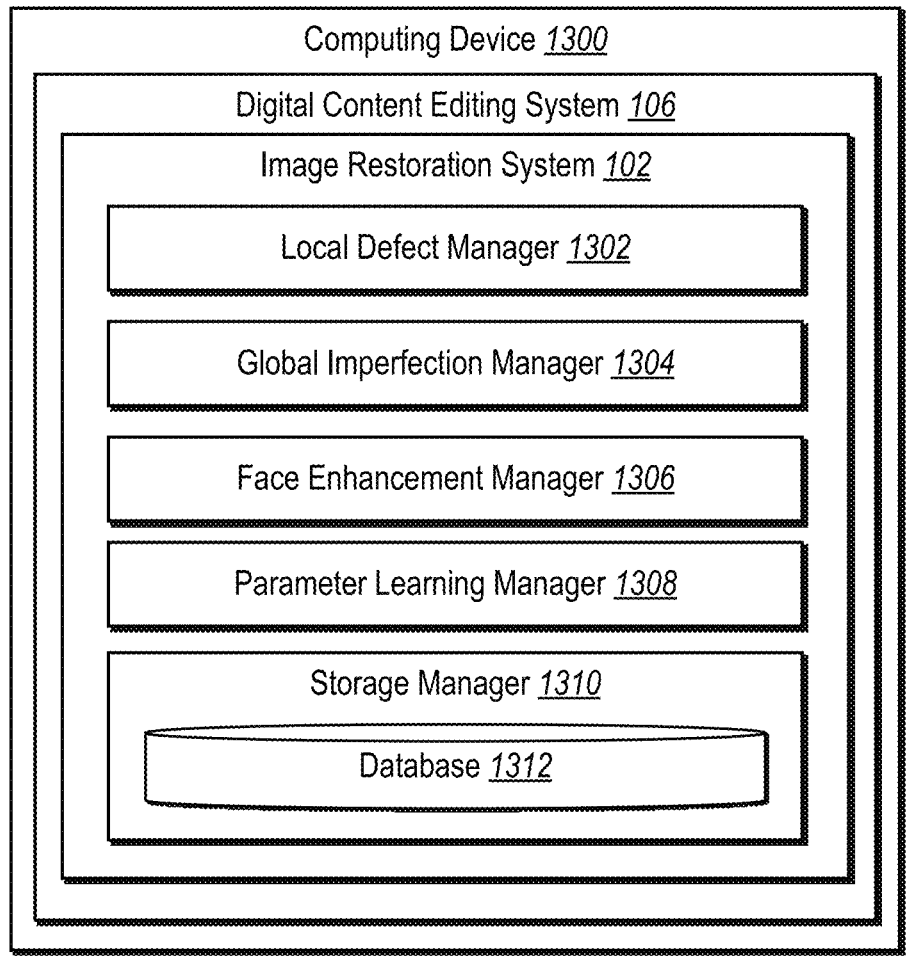
FIG. 13 illustrates a schematic diagram of an image restoration system in accordance with one or more embodiments.

Looking now to FIG. 13, additional detail will be provided regarding components and capabilities of the image restoration system 102. Specifically, FIG. 13 illustrates an example schematic diagram of the image restoration system 102 on an example computing device 1300 (e.g., one or more of the client device 108 and/or the server(s) 104). As shown in FIG. 13, the image restoration system 102 includes a local defect manager 1302, a global imperfection manager 1304, a face enhancement manager 1306, a parameter learning manager 1308, and a storage manager 1310.

As just mentioned, the image restoration system 102 includes a local defect manager 1302. In particular, the local defect manager 1302 manages, maintains, determines, detects, extracts, or identifies local defects within a digital image. For example, the local defect manager 1302 determines local defects such as scratches, folds, and dust within a digital image utilizing defect detection neural network (e.g., the defect detection neural network 402). In some cases, the local defect manager 1302 generates a segmentation mask that indicates locations of local defects. In addition, the local defect manager 1302 repairs the local defects utilizing an inpainting model to replace local defect pixels with pixels that reduce the appearance of the local defects.

As further illustrated in FIG. 13, the image restoration system 102 includes a global imperfection manager 1304. In particular, the global imperfection manager 1304 manages, maintains, determines, detects, or identifies global imperfections within a digital image. For example, the global imperfection manager 1304 utilizes a global correction neural network (e.g., the global correction neural network 802) to identify and correct global imperfections. Indeed, the global imperfection manager 1304 extracts a feature vector for the digital image and modifies the feature vector to generate a modified digital image utilizing the global correction neural network, as described above.

In addition, the image restoration system 102 includes a face enhancement manager 1306. In particular, the face enhancement manager 1306 determines, generates, enhances, or improves pixels of a digital image (or a portion of a digital image) depicting a face. For example, the face enhancement manager 1306 utilizes a face enhancement neural network to enhance face pixels by mapping the digital image into a latent space to identify a latent code for an enhanced digital image corresponding to the face in the digital image. The face enhancement manager 1306 further utilizes the face enhancement neural network to generate an enhanced face image from the identified latent code.

Further, the image restoration system 102 includes a parameter learning manager 1308. In particular, the parameter learning manager 1308 learns parameters and/or weights for one or more of a defect detection neural network, a global correction neural network, or a face enhancement neural network. For example, the parameter learning manager 1308 utilizes a training or a tuning process to learn parameters for various neural network architectures, as described herein.

The image restoration system 102 further includes a storage manager 1310. The storage manager 1310 operates in conjunction with or include one or more memory devices such as the database 1312 (e.g., the database 112) that stores various data such as a repository of digital images and various neural networks. For instance, the storage manager 1310 stores a defect detection neural network, a global correction neural network, and a face enhancement neural network.

In one or more embodiments, each of the components of the image restoration system 102 are in communication with one another using any suitable communication technologies. Additionally, the components of the image restoration system 102 is in communication with one or more other devices including one or more client devices described above. It will be recognized that although the components of the image restoration system 102 are shown to be separate in FIG. 13, any of the subcomponents may be combined into fewer components, such as into a single component, or divided into more components as may serve a particular implementation. Furthermore, although the components of FIG. 13 are described in connection with the image restoration system 102, at least some of the components for performing operations in conjunction with the image restoration system 102 described herein may be implemented on other devices within the environment.

The components of the image restoration system 102 can include software, hardware, or both. For example, the components of the image restoration system 102 can include one or more instructions stored on a computer-readable storage medium and executable by processors of one or more computing devices (e.g., the computing device 1300). When executed by the one or more processors, the computer-executable instructions of the image restoration system 102 can cause the computing device 1300 to perform the methods described herein. Alternatively, the components of the image restoration system 102 can comprise hardware, such as a special purpose processing device to perform a certain function or group of functions. Additionally, or alternatively, the components of the image restoration system 102 can include a combination of computer-executable instructions and hardware.

Furthermore, the components of the image restoration system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image restoration system 102 may be implemented as part of a stand-alone application on a personal computing device or a mobile device. Alternatively, or additionally, the components of the image restoration system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, ILLUSTRATOR®, and INDESIGN®. "ADOBE," "ADOBE EXPERIENCE MANAGER," "CREATIVE CLOUD," "ADOBE STOCK," "PHOTOSHOP," "ILLUSTRATOR," and "INDESIGN" are either registered trademarks or trademarks of Adobe Inc. in the United States and/or other countries.

FIGS. 1-13 the corresponding text, and the examples provide a number of different systems, methods, and non-transitory computer readable media for restoring degraded digital images by removing local defects, global imperfections, and/or enhancing faces. In addition to the foregoing, embodiments can also be described in terms of flowcharts comprising acts for accomplishing a particular result. For example, FIGS. 14-16 illustrate flowcharts of example sequences or series of acts in accordance with one or more embodiments.

Figure 15:
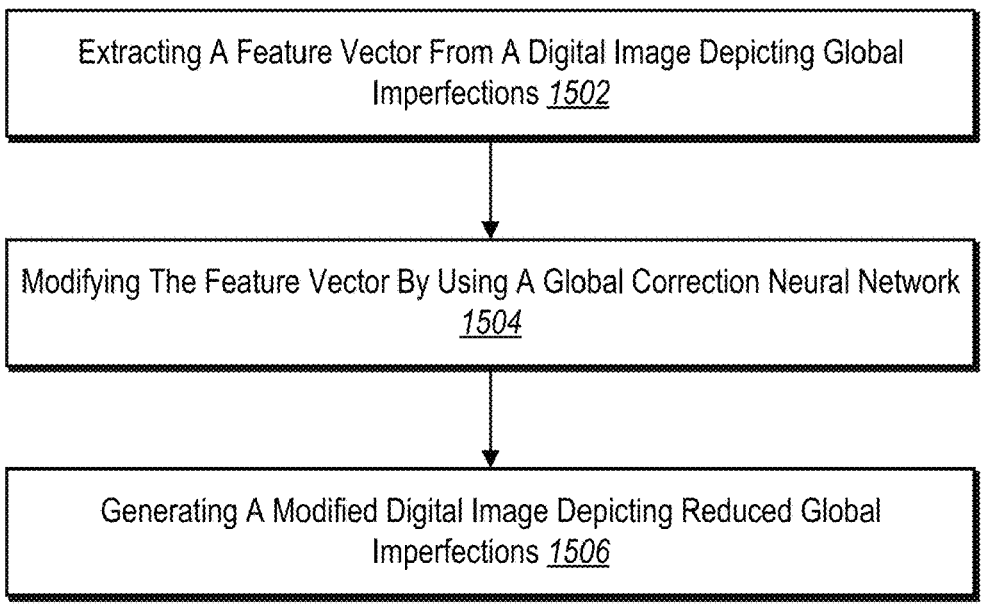
Figure 16:
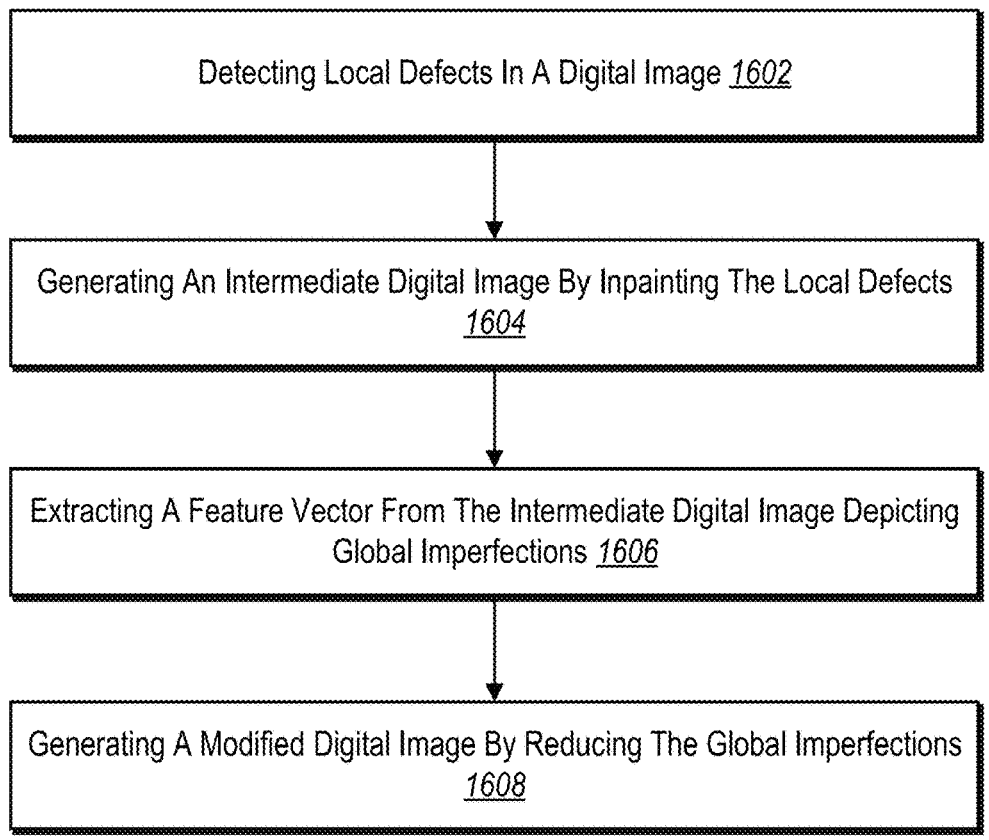

While FIGS. 14-16 illustrate acts according to one or more embodiments, alternative embodiments may omit, add to, reorder, and/or modify any of the acts shown in FIGS. 14-16. The acts of FIGS. 14-16 can be performed as part of a method. Alternatively, a non-transitory computer readable medium can comprise instructions, that when executed by one or more processors, cause a computing device to perform the acts of FIGS. 14-16. In still further embodiments, a system can perform the acts of FIGS. 14-16. Additionally, the acts described herein may be repeated or performed in parallel with one another or in parallel with different instances of the same or other similar acts.

FIG. 14 illustrates an example series of acts 1400 of restoring degraded digital images by removing local defects, global imperfections, and/or enhancing faces. In particular, the series of acts 1400 includes an act 1402 of generating a segmentation mask indicating local defects. For example, the act 1402 involves generating a segmentation mask indicating one or more local defects within a digital image utilizing a defect detection neural network. In some cases, the act 1402 involves generating the segmentation mask to indicate locations for one or more of scratches, dust, folds, creases, or tears within the digital image utilizing the defect detection neural network.

As shown, the series of acts 1400 includes an act 1404 of determining pixels to fill the local defects. In particular, the act 1404 involves determining pixels from the digital image for filling the one or more local defects indicated by the segmentation mask utilizing an inpainting model. In some cases, the act 1404 involves determining pixels within the digital image that reduce appearance of the one or more local defects when used to replace pixels of the one or more local defects utilizing the inpainting model.

As also shown, the series of acts 1400 includes an act 1406 of generating a modified digital image by inpainting the local defects. In particular, the act 1406 involves generating a modified digital image by inpainting the one or more local defects utilizing the determined pixels from the inpainting model. In some cases, the act 1406 involves inpainting the one or more local defects utilizing the inpainting model to replace pixels of the one or more local defects with the determined pixels to reduce appearance of the one or more local defects.

In certain embodiments, the series of acts 1400 includes an act of extracting a feature vector from the modified digital image depicting one or more global imperfections utilizing a global correction neural network. Further, the series of acts 1400 sometimes includes an act of generating a second modified digital image by modifying the feature vector to reduce the one or more global imperfections utilizing the global correction neural network.

In the same or different embodiments, the series of acts 1400 includes an act of mapping the modified digital image into a latent space utilizing a face enhancement neural network. In addition, the series of acts 1400 includes an act of determining a latent code corresponding to the modified digital image within the latent space. Further, the series of acts 1400 includes an act of generating, from the latent code corresponding to the modified digital image, a third modified digital image utilizing the face enhancement neural network to correct pixels depicting the one or more faces.

In certain embodiments, the series of acts 1400 includes an act of generating a set of sample defect digital images for learning parameters of the defect detection neural network. Generating the set of sample defect digital images sometimes involves warping a local defect image to generate a plurality of local defect images depicting different patterns of local defects, generating a plurality of blended defect digital images by blending a sample digital image with the plurality of local defect images, and/or degrading the plurality of blended defect digital images utilizing a synthetic aging algorithm to generate the set of sample defect digital images.

FIG. 15 illustrates an example series of acts 1500 of restoring degraded digital images by removing local defects, global imperfections, and/or enhancing faces. In particular, the series of acts 1500 includes an act 1502 of extracting a feature vector from a digital image depicting global imperfections. For example, the act 1502 involves extracting a feature vector from a digital image depicting one or more global imperfections utilizing a global correction neural network. In some cases, the act 1502 involves extracting the feature vector utilizing the global correction neural network comprising a generator neural network including parameters learned through adversarial training.

In addition, the series of acts 1500 includes an act 1504 of modifying the feature vector by using a global correction neural network. In particular, the act 1504 involves modifying the feature vector according to learned parameters of the global correction neural network to reduce appearance of the one or more global imperfections. For example, the act 1504 involves modifying the feature vector to perform one or more of reducing image blur, reducing image noise, or improving image color according to the learned parameters.

As shown, the series of acts 1500 includes an act 1506 generating a modified digital image depicting reduced global imperfections. In particular, the act 1506 involves generating, from the modified feature vector, a modified digital image depicting reductions in the one or more global imperfections. For example, the act 1506 involves utilizing the global correction neural network to generate the modified digital image from the modified feature vector to depict one or more of reduced image blur, reduced image noise, or improved image color.

In some embodiments, the series of acts 1500 includes an act of detecting one or more local defects within the digital image utilizing a defect detection neural network and an act of generating the modified digital image by further inpainting the one or more local defects utilizing an inpainting model. In these or other embodiments, the series of acts 1500 includes acts of mapping the modified digital image into a latent space utilizing a face enhancement neural network comprising parameters learned from clean digital images, determining a latent code nearest to the mapping of modified digital image within the latent space, and generating, from the latent code nearest to the mapping of the modified digital image, a third modified digital image utilizing the face enhancement neural network to correct pixels depicting the one or more faces according to the parameters learned from the clean digital images.

In certain implementations, the series of acts 1500 includes an act of generating a set of sample imperfection digital images for learning parameters of the global correction neural network. Generating the set of sample imperfection digital images sometimes involves utilizing a synthetic aging algorithm to blend the plurality of sample digital images with old paper digital images and to generate degradation effects within the plurality of sample digital images and generating halftone artifacts to include within a subset of the sample digital images.

FIG. 16 illustrates an example series of acts 1600 of restoring degraded digital images by removing local defects, global imperfections, and/or enhancing faces. In particular, the series of acts 1600 includes an act 1602 of detecting local defects in a digital image. For example, the act 1602 involves detecting one or more local defects within the digital image utilizing the defect detection neural network. In some cases, the act 1602 involves generating a segmentation mask indicating locations of one or more of scratches, dust, folds, creases, or tears within the digital image utilizing the defect detection neural network.

As shown, the series of acts 1600 also includes an act 1604 of generating an intermediate digital image by inpainting the local defects. In particular, the act 1604 involves generating an intermediate digital image by inpainting the one or more local defects utilizing the inpainting model.

As further shown in FIG. 16, the series of acts 1600 includes an act 1606 or extracting a feature vector from the intermediate digital image depicting global imperfections. In particular, the act 1606 involves extracting a feature vector from the intermediate digital image depicting one or more global imperfections utilizing the global correction neural network.

Additionally, the series of acts 1600 includes an act 1608 of generating a modified digital image by reducing the global imperfections. In particular, the act 1608 involves generating a modified digital image by modifying the feature vector to reduce the one or more global imperfections utilizing the global correction neural network.

In some cases, the series of acts 1600 includes an act of reducing the one or more global imperfections by modifying the feature vector utilizing the global correction neural network to perform one or more of reducing image blur, reducing image noise, or improving image color. In some cases, the series of acts 1600 includes acts of mapping the modified digital image into a latent space utilizing a face enhancement neural network comprising parameters learned from clean digital images, determining a latent code that minimizes a difference between the modified digital image and a clean digital image represented by the latent code, and generating, from the latent code corresponding to the mapping of the modified digital image, an additional modified digital image utilizing the face enhancement neural network to correct pixels depicting the one or more faces according to the parameters learned from the clean digital images.

In certain embodiments, the series of acts 1600 includes an act of generating a set of sample defect digital images for learning parameters of the defect detection neural network. Generating the set of sample defect digital images can include acts of warping a local defect image to generate a plurality of local defect images depicting different patterns of local defects, generating a plurality of blended defect digital images by blending a sample digital image with the plurality of local defect images, and degrading the plurality of blended defect digital images to generate the set of sample defect digital images utilizing a synthetic aging algorithm to blend the plurality of blended defect digital images with old paper digital images and to generate degradation effects within the plurality of blended defect digital images.

In one or more embodiments, the series of acts 1600 includes an act of receiving an indication of user interaction modifying a local defect reduction element. Additionally, the series of acts 1600 includes an act of modifying an area of the digital image for detecting the one or more local defects in accordance with the user interaction modifying the local defect reduction element.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
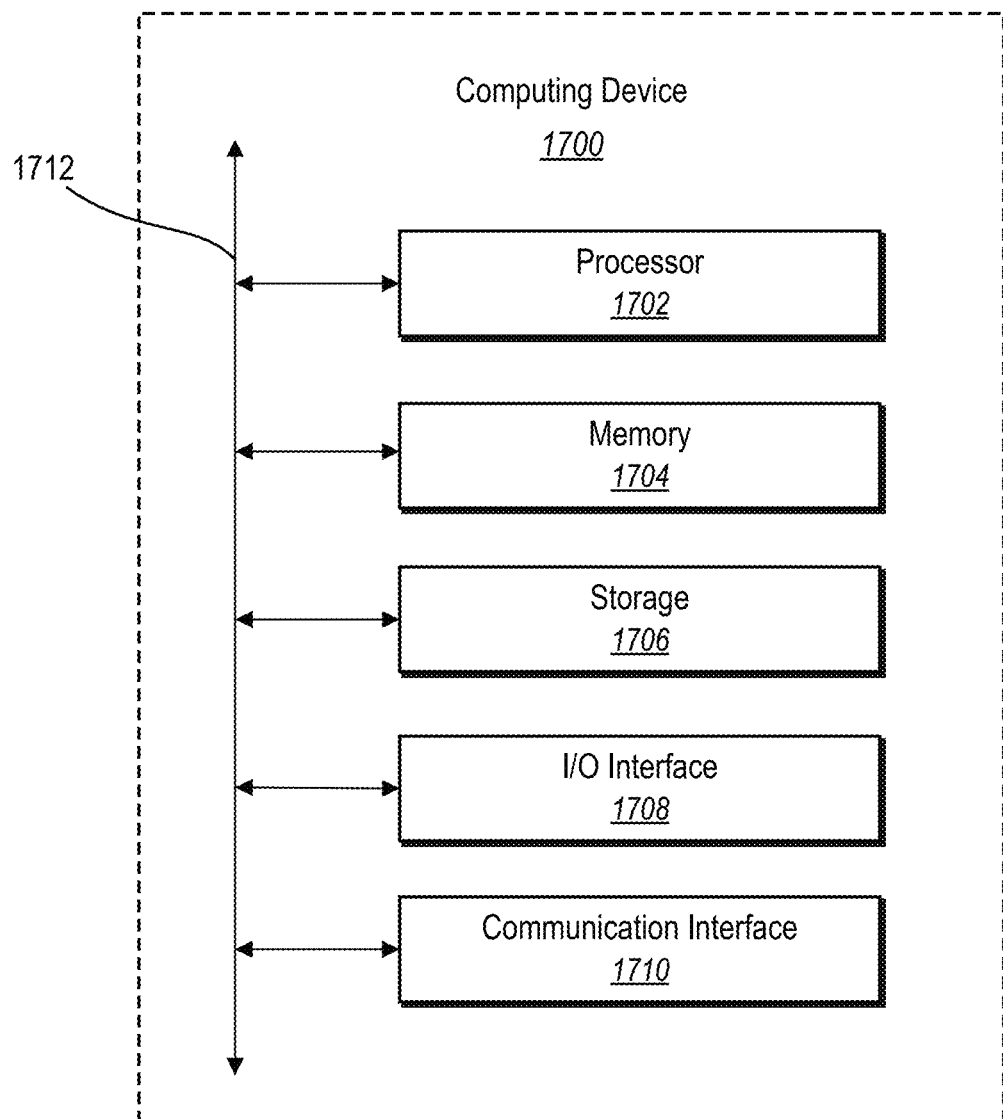
FIG. 17 illustrates a block diagram of an example computing device in accordance with one or more embodiments.

FIG. 17 illustrates, in block diagram form, an example computing device 1700 (e.g., the computing device 1000, the client device 108, and/or the server(s) 104) that may be configured to perform one or more of the processes described above. One will appreciate that the image restoration system 102 can comprise implementations of the computing device 1700. As shown by FIG. 17, the computing device can comprise a processor 1702, memory 1704, a storage device 1706, an I/O interface 1708, and a communication interface 1710. Furthermore, the computing device 1700 can include an input device such as a touchscreen, mouse, keyboard, etc. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, storage device 1706 can comprise a non-transitory storage medium described above. The storage device 1706 may include a hard disk drive (HDD), flash memory, a Universal Serial Bus (USB) drive or a combination of these or other storage devices.

The computing device 1700 also includes one or more input or output ("I/O") devices/interfaces 1708, which are provided to allow a user to provide input to (such as user strokes), receive output from, and otherwise transfer data to and from the computing device 1700. These I/O devices/interfaces 1708 may include a mouse, keypad or a keyboard, a touch screen, camera, optical scanner, network interface, modem, other known I/O devices or a combination of such I/O devices/interfaces 1708. The touch screen may be activated with a writing device or a finger.

The I/O devices/interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device and one or more other computing devices 1700 or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:

generate, utilizing a defect detection neural network, a segmentation mask indicating one or more local defects localized to specific portions of a digital image;

determine pixels from the digital image for filling the one or more local defects indicated by the segmentation mask utilizing an inpainting model;

generate a modified digital image by inpainting the one or more local defects utilizing the determined pixels from the inpainting model; and extract, utilizing a global correction neural network, a feature vector from the modified digital image depicting one or more global imperfections comprising one or more of image blur, faded colors, faded saturation, image graininess, or sepia effects.

2. The non-transitory computer readable medium of claim 1, further comprising instructions that, when executed by the at least one processor, cause the computing device to generate the segmentation mask indicating the one or more local defects by generating the segmentation mask to indicate locations for one or more of scratches, dust, folds, creases, or tears within the digital image utilizing the defect detection neural network.

3. The non-transitory computer readable medium of claim 1, further comprising instructions that, when executed by the at least one processor, cause the computing device to determine the pixels for filling the one or more local defects by determining pixels within the digital image that reduce appearance of the one or more local defects when used to replace pixels of the one or more local defects utilizing the inpainting model.

4. The non-transitory computer readable medium of claim 1, further comprising instructions that, when executed by the at least one processor, cause the computing device to generate the modified digital image by inpainting the one or more local defects utilizing the inpainting model to replace pixels of the one or more local defects with the determined pixels to reduce appearance of the one or more local defects.

5. The non-transitory computer readable medium of claim 1, further comprising instructions that, when executed by the at least one processor, cause the computing device to:

generate a second modified digital image by modifying the feature vector to reduce the one or more global imperfections depicted in the modified digital image utilizing the global correction neural network.

6. The non-transitory computer readable medium of claim 1, further comprising instructions that, when executed by the at least one processor, cause the computing device to:

map the modified digital image into a latent space utilizing a face enhancement neural network;

determine a latent code corresponding to the modified digital image within the latent space; and generate, from the latent code corresponding to the modified digital image, a third modified digital image utilizing the face enhancement neural network to correct pixels depicting one or more faces.

7. The non-transitory computer readable medium of claim 1, further comprising instructions that, when executed by the at least one processor, cause the computing device to generate a set of sample defect digital images for learning parameters of the defect detection neural network by:

warping a local defect image to generate a plurality of local defect images depicting different patterns of local defects;

generating a plurality of blended defect digital images by blending a sample digital image with the plurality of local defect images; and degrading the plurality of blended defect digital images utilizing a synthetic aging algorithm to generate the set of sample defect digital images.

8. A computer-implemented method for globally correcting digital images, the computer-implemented method comprising:

extracting, utilizing a global correction neural network, a feature vector from a digital image depicting one or more global imperfections comprising one or more of image blur, faded colors, faded saturation, image graininess, or sepia effects;

modifying the feature vector according to parameters of the global correction neural network learned from sample images depicting global imperfections to reduce appearance of the one or more global imperfections; and generating, from the modified feature vector, a modified digital image depicting reductions in the one or more global imperfections.

9. The computer-implemented method of claim 8, wherein extracting the feature vector from the digital image comprises extracting the feature vector utilizing the global correction neural network comprising a generator neural network including parameters learned through adversarial training.

10. The computer-implemented method of claim 8, wherein modifying the feature vector according to the parameters of the global correction neural network comprises modifying the feature vector to perform one or more of reducing image blur, reducing image noise, or improving image color according to the parameters.

11. The computer-implemented method of claim 8, wherein generating the modified digital image comprises utilizing the global correction neural network to generate the modified digital image from the modified feature vector to depict one or more of reduced image blur, reduced image noise, or improved image color.

12. The computer-implemented method of claim 8, further comprising:

detecting one or more local defects within the digital image utilizing a defect detection neural network; and generating the modified digital image by further inpainting the one or more local defects utilizing an inpainting model.

13. The computer-implemented method of claim 8, further comprising:

mapping the modified digital image into a latent space utilizing a face enhancement neural network comprising parameters learned from clean digital images;

determining a latent code nearest to the mapping of modified digital image within the latent space; and generating, from the latent code nearest to the mapping of the modified digital image, a third modified digital image utilizing the face enhancement neural network to correct pixels depicting one or more faces according to the parameters learned from the clean digital images.

14. The computer-implemented method of claim 8, further comprising generating a set of sample imperfection digital images for learning the parameters of the global correction neural network by degrading a plurality of sample digital images by:

utilizing a synthetic aging algorithm to blend the plurality of sample digital images with old paper digital images and to generate degradation effects within the plurality of sample digital images; and generating halftone artifacts to include within a subset of the sample digital images.

15. A system comprising:

one or more memory devices comprising a digital image, a defect detection neural network, an inpainting model, and a global correction neural network; and one or more computing devices that are configured to cause the system to:

detect one or more local defects within the digital image utilizing the defect detection neural network;

generate an intermediate digital image by inpainting the one or more local defects utilizing the inpainting model;

extract, utilizing the global correction neural network, a feature vector from the intermediate digital image depicting one or more global imperfections comprising one or more of image blur, faded colors, faded saturation, image graininess, or sepia effects; and generate a modified digital image by modifying the feature vector to reduce the one or more global imperfections utilizing the global correction neural network.

16. The system of claim 15, wherein the one or more computing devices are further configured to cause the system to detect the one or more local defects within the digital image by generating a segmentation mask indicating locations of one or more of scratches, dust, folds, creases, or tears within the digital image utilizing the defect detection neural network.

17. The system of claim 15, wherein the one or more computing devices are further configured to cause the system to reduce the one or more global imperfections by modifying the feature vector utilizing the global correction neural network to reduce one or more the image blur, the faded colors, the faded saturation, the image graininess, or the sepia effects.

18. The system of claim 15, wherein the one or more computing devices are further configured to cause the system to:

map the modified digital image into a latent space utilizing a face enhancement neural network comprising parameters learned from clean digital images;

determine a latent code that minimizes a difference between the modified digital image and a clean digital image represented by the latent code; and generate, from the latent code corresponding to the mapping of the modified digital image, an additional modified digital image utilizing the face enhancement neural network to correct pixels depicting the one or more faces according to the parameters learned from the clean digital images.

19. The system of claim 15, wherein the one or more computing devices are further configured to cause the system to generate a set of sample defect digital images for learning parameters of the defect detection neural network by:

warping a local defect image to generate a plurality of local defect images depicting different patterns of local defects;

generating a plurality of blended defect digital images by blending a sample digital image with the plurality of local defect images; and degrading the plurality of blended defect digital images to generate the set of sample defect digital images utilizing a synthetic aging algorithm to blend the plurality of blended defect digital images with old paper digital images and to generate degradation effects within the plurality of blended defect digital images.

20. The system of claim 15, wherein the one or more computing devices are further configured to cause the system to:

receive an indication of user interaction modifying a local defect reduction element; and modifying an area of the digital image for detecting the one or more local defects in accordance with the user interaction modifying the local defect reduction element.

* * * * *